US007656851B1

(12) United States Patent
Ghanadan et al.

(10) Patent No.: US 7,656,851 B1
(45) Date of Patent: Feb. 2, 2010

(54) ADAPTIVE MESSAGE ROUTING FOR MOBILE AD HOC NETWORKS

(75) Inventors: Reza Ghanadan, Berkeley Heights, NJ (US); John A. Gu, Rockaway, NJ (US); Jessica Hsu, Washington, DC (US); Gregory S. Sadosuk, Fairfax, VA (US); Phong C. Khuu, Ashburn, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 336 days.

(21) Appl. No.: 11/546,783

(22) Filed: Oct. 12, 2006

(51) Int. Cl.
*H04W 20/67* (2006.01)

(52) U.S. Cl. ........................ 370/338; 370/328; 370/256

(58) Field of Classification Search .................. 370/338
See application file for complete search history.

(56) References Cited

U.S. PATENT DOCUMENTS 5,579,316 A * 11/1996 Venters et al. .............. 370/392
5,652,751 A 7/1997 Sharony
6,754,192 B2 6/2004 Kennedy
6,870,846 B2 3/2005 Cain
6,954,449 B2 10/2005 Cain
6,961,310 B2 11/2005 Cain
2002/0145978 A1 10/2002 Batsell
2003/0179742 A1 9/2003 Ogier
2004/0003111 A1* 1/2004 Maeda et al. ............... 709/237
2005/0030921 A1 2/2005 Yau
2005/0041627 A1 2/2005 Duggi
2005/0041628 A1 2/2005 Duggi
2005/0073992 A1 4/2005 Lee
2005/0090201 A1 4/2005 Lengies
2005/0094574 A1 5/2005 Han
2005/0152305 A1* 7/2005 Ji et al. ....................... 370/328
2005/0254473 A1 11/2005 Preguica

OTHER PUBLICATIONS

Understanding link quality in 802.11 mobile ad hoc networks, Gaertner et. al. Internet Computing, IEEE; vol. 8 Issue1, pp. 55-60.*
R. Ghanadan, et al., Flexible Access Secure Transfer (FAST) Tactical Communications Waveform for Airborne Networking, IEEE MILCOM 2005, v.2 at 1167-73 (Oct. 17-20, 2005).

(Continued)

*Primary Examiner*—Patrick N Edouard
*Assistant Examiner*—Dai A Phuong
(74) *Attorney, Agent, or Firm*—Leo Zucker

(57) ABSTRACT

Domains are formed in a mobile ad hoc network by exchanging topology update messages among neighboring nodes, each message including the node coverage of the originating node. The node having an optimum coverage of its neighbors becomes a domain lead (DL) node, and nodes within hearing distance or range of the DL node form a network domain. Each domain node, including the DL, selects a set of bridge nodes (BNs) that can link the domain node to nodes in corresponding neighboring domains. All domain lead nodes in the network exchange messages to inform one another of the nodes contained in their respective domains. A node in one domain seeking a route for a message destined to a node in another domain, may send a route discovery (RDisc) message to the DL node of the inquiring node's domain. A responsive route resolution (RRes) message is returned to the inquiring node.

25 Claims, 16 Drawing Sheets

OTHER PUBLICATIONS

Y. Ge, et al., Hierarchical OLSR—A Scalable Proactive Routing Protocol for Heterogeneous Ad Hoc Networks, IEEE Int'l Conf. WiMob 2005, v.3 at 17-23 (Aug. 22-24, 2005).

Y. Ge, et al., Quality of Service Routing in Ad-Hoc Networks Using OLSR, IEEE Proc. 36th Hawaii Int'l Conf. on Systems Sciences (2003).

* cited by examiner

| NODE ID | LSL | NC | DL | NDC | TIMER |
|---|---|---|---|---|---|
| N1 | 15/13 | 500 | DL1 | 350 | 3 |
| | | | | | |
| | | | | | |
| | | | | | |

| NODE ID | LINK NODE ID | LSL | TIMER |
|---|---|---|---|
| N3 | N1 | 27/13 | 3 |
| | | | |
| | | | |
| | | | |

| NODE ID | LINK NODE ID | LP | HOPCNT | TIMER |
|---|---|---|---|---|
| N3 | N1 | | | 3 |
| | | | | |
| | | | | |
| | | | | |

FIG. 8

TU1 MESSAGE FORMAT

| TYPE | LEN | SID | NC | m | n | H1N₁ | ... | H1Nₘ | DL₁ | ... | DLₙ | CRC |
|------|-----|-----|----|----|----|------|-----|------|-----|-----|-----|-----|

|  | 15 | 14 | 13 | 12 | 11 | 10 | 9 | 8 | 7 | 6 | 5 | 4 | 3 | 2 | 1 | 0 |
|--|----|----|----|----|----|----|---|---|---|---|---|---|---|---|---|---|
| 1 | TYPE | | | | | | | LENGTH | | | | | | | | |
| 2 | STATE | | | | | | | SID | | | | | | | | |
| 3 | | | | | | | | NC | | | | | | | | |
| 4 | d (NUMBER OF ND) | | | | | | | Tf | | | | | | | | |
| 5 | m (NUMBER OF ND) | | | | | | | | | | n (NUMBER OF DL) | | | | | |
| 6 | ND₁ | | | | | | | NNC₁ | | | | | | | | |
| : | : | | | | | | | : | | | | | | | | |
| d+5 | NDd | | | | | | | NNCd | | | | | | | | |
| d+6 | LSL₁ | | | | | | | H1N₁ | | | | | | | | |
| : | : | | | | | | | : | | | | | | | | |
| d+m+5 | LSLₘ | | | | | | | H1Nₘ | | | | | | | | |
| d+m+6 | LSL₁ | | | | | | | DL₁ | | | | | | | | |
| : | : | | | | | | | : | | | | | | | | |
| d+m+n+5 | LSLₙ | | | | | | | DLₙ | | | | | | | | |
| d+m+n+6 | | | | | | | | CRC | | | | | | | | |

TUd MESSAGE FORMAT

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | TYPE | LEN | STATE | SID | OID | SEQ | n | m | $BN_1$ | ... | $BN_n$ | $H1N_1$ | ... | $H1N_m$ | DLT | CRC |
| 1 | TYPE | | | | | | | | LENGTH | | | | | | | |
| 2 | STATE | | | | | | | | SID | | | | | | | |
| 3 | ORIGINATOR ID | | | | | | | | | | | | | | | |
| 4 | SEQUENCE NUMBER | | | | | | | | | | | | | | | |
| 5 | n (NUMBER OF BN) | | | | | | | | m (NUMBER OF H1N) | | | | | | | |
| 6 | RESERVED | | | | | | | | $BN_1$ | | | | | | | |
| . | . | | | | | | | | . | | | | | | | |
| n+5 | RESERVED | | | | | | | | $BN_n$ | | | | | | | |
| n+6 | $HopOff_1$ | | | | | | | | $UT_1$ | | | | | | | |
| n+7 | $LCI_1$ | | | | | | | | $H1N_1$ | | | | | | | |
| n+8 | | | | | | | | | $LQI_1$ | | | | | | | |
| . | . | | | | | | | | . | | | | | | | |
| n+2m+7 | $HopOff_m$ | | | | | | | | $UT_i$ | | | | | | | |
| n+2m+8 | $LCI_m$ | | | | | | | | $H1N_m$ | | | | | | | |
| n+2m+9 | | | | | | | | | $LQI_m$ | | | | | | | |
| n+2m+9+i(2i,m) | $DL_1$ & $DLcnt_1$ (DL Track) | | | | | | | | | | | | | | | |
| | $DL_k$ | | | | | | | | | | | | | | | |
| | Last ID | | | | | | | | | | | | | | | |
| | CRC | | | | | | | | | | | | | | | |

| TYPE | LEN | STATE | SID | OID | SEQ | DEST ID | n | BN₁ | ... | BNₙ | DLT | LAST ID | CRC |
|------|-----|-------|-----|-----|-----|---------|---|-----|-----|-----|-----|---------|-----|

|   | 15 | 14 | 13 | 12 | 11 | 10 | 9 | 8 | 7 | 6 | 5 | 4 | 3 | 2 | 1 | 0 |
|---|----|----|----|----|----|----|----|----|----|----|----|----|----|----|----|----|
| 1 | TYPE | | | | | | | | | | LENGTH | | | | | |
| 2 | STATE | | | | | | | | | SID | | | | | | |
| 3 | ORIGINATOR ID | | | | | | | | | | | | | | | |
| 4 | SEQUENCE NUMBER | | | | | | | | | | | | | | | |
| 5 | DESTINATION ID | | | | | | | | | | | | | | | |
| 6 | RESERVED | | | | | | | | n (NUMBER OF BN) | | | | | | | |
| 7 | RESERVED | | | | | | | | BN₁ | | | | | | | |
| ... | | | | | | | | | | | | | | | | |
| n+6 | RESERVED | | | | | | | | BNₙ | | | | | | | |
| n+7 | DL₁ & DLcnt₁ (DL TRACK) | | | | | | | | | | | | | | | |
| ... | | | | | | | | | | | | | | | | |
| DL+n+6 | DLₖ | | | | | | | | | | | | | | | |
| DL+n+7 | LAST ID | | | | | | | | | | | | | | | |
| DL+n+8 | CRC | | | | | | | | | | | | | | | |

| TYPE | LEN | SID | SEQ | DEST ID | LAST ID | HOP CNT | CRC |
|---|---|---|---|---|---|---|---|

| | 15 14 13 12 11 10 9 8 7 6 5 4 3 2 1 0 | |
|---|---|---|
| 1 | TYPE | LENGTH |
| 2 | STATE | SID |
| 3 | ORIGINATOR ID | |
| 4 | SEQUENCE NUMBER | |
| 5 | DESTINATION ID | |
| 6 | LAST ID | |
| 7 | HOP COUNT | |
| 8 | CRC | |

ADAPTIVE MESSAGE ROUTING FOR MOBILE AD HOC NETWORKS

BACKGROUND OF THE INVENTION

1. Field of the Invention

This invention is a directed to a message routing protocol for a mobile ad hoc network (MANET).

2. Discussion of the Known Art

Mobile ad hoc networks or MANETs are self configuring networks in which a number of mobile nodes may interconnect with one another via wireless links. The locations of the nodes with respect to one another, i.e., the topology of the network, may therefore change rapidly particularly when such networks are deployed in emergency situations or in military operations. Early implementations of MANETs were referred to as "packet radio" networks. Today, for example, the so-called "Wi-Fi" wireless protocol specified by IEEE 802.11x also includes an ad-hoc mode that enables message traffic to be handled among a local "cloud" of wireless devices (e.g., Wi-Fi equipped laptops) in the absence of a wired infrastructure.

In a military joint airborne environment, efficient networking requires operational flexibility with ad-hoc management of networking resources. It is also important to maintain low overhead so that bandwidth remains available for communication among users. Network users may also require end-to-end quality-of-service (Qos) support to manage latency, stability, and response time. Other desirable operational requirements may include security, adaptability, interoperability, speedy join time, and rapid network formation.

Request for Comment (RFC) No. 3626 (October 2003) discloses a so-called Optimized Link State Routing (OLSR) protocol for mobile ad hoc networks. A given node in the network selects a subset of neighboring nodes each of which is within hearing distance (one hop) from the given node. The nodes of this subset are referred to as multipoint relays (MPRs), and are situated so that when they retransmit a message broadcast by the given node, the message will be received by all nodes that are two hops away from the given node. Neighbors of the given node that are not in its MPR set do not forward messages received from the given node, however. Although the MPRs may help to reduce redundant retransmissions of network updates, a fast changing topology is likely to trigger an excessive number of updates and thus propagate increased control overhead throughout the network. See also US Patent Application Publication 2002/0145978 (Oct. 10, 2002) which discloses a routing protocol for mobile networks, including the discovery of a route to a destination node that is beyond two hops from a source node wanting to send a message.

An Internet Draft entitled "The Zone Routing Protocol (ZRP) for Ad Hoc Networks" (July 2002) discloses a hybrid protocol having both proactive and reactive components. It is suggested in an implementation of ZRP that OLSR be used for proactive routing, and that Ad-Hoc On-Demand Distance Vector Routing (AODV) be used for reactive routing. Like OLSR, ZRP is not readily adaptable to rapid changes in network topology, however.

U.S. Pat. No. 5,652,751 (Jul. 29, 1997) discloses an architecture for mobile radio networks with dynamically changing topology. A network is partitioned into physical subnets each of which includes a number of nodes in close proximity to one another. Each node in a physical subnet is affiliated with a corresponding node in each of the other physical subnets, thus defining a number of virtual subnets. A message is routed from a source node to a remote destination node in the network, by forwarding the message through nodes that are members of the same physical subnet during a first phase of two alternating transmission phases, and through nodes that are members of the same virtual subnet during the second transmission phase. Although the patent contemplates network routing in a fast changing topology, it requires complex address management, physical partition of subnets, and hardware/spectrum changes.

SUMMARY OF THE INVENTION

According to the invention, a method of routing messages in a mobile ad hoc network (MANET) includes forming logical domains in the network by exchanging first topology update (TU1) messages within groups of neighboring nodes, and identifying in the TU1 message the node sending the TU1 message and a node coverage the sending node identifying certain nodes within a one hop range of the sending node.

The method further includes designating a domain lead (DL) node as the node having an optimum node coverage among the nodes of each group, defining a domain as containing all nodes within a one hop range of the DL node, and selecting, for each node of the domain including the DL node, a number of bridge nodes (BNs) for linking a given domain node to nodes in corresponding neighboring domains. Domain topology update (TUd) messages are exchanged among the DL nodes in the network, wherein the TUd messages identify those nodes contained in the domain of each DL node originating a TUd message.

For a better understanding of the invention, reference is made to the following description taken in conjunction with the accompanying drawing and the appended claims.

BRIEF DESCRIPTION OF THE DRAWING

In the drawing:

FIG. 8 is one example of a hop k (Hk) table as configured at a given node;

FIG. 12 shows a mobile node entering a network at power on;

DETAILED DESCRIPTION OF THE INVENTION

Figure 1:
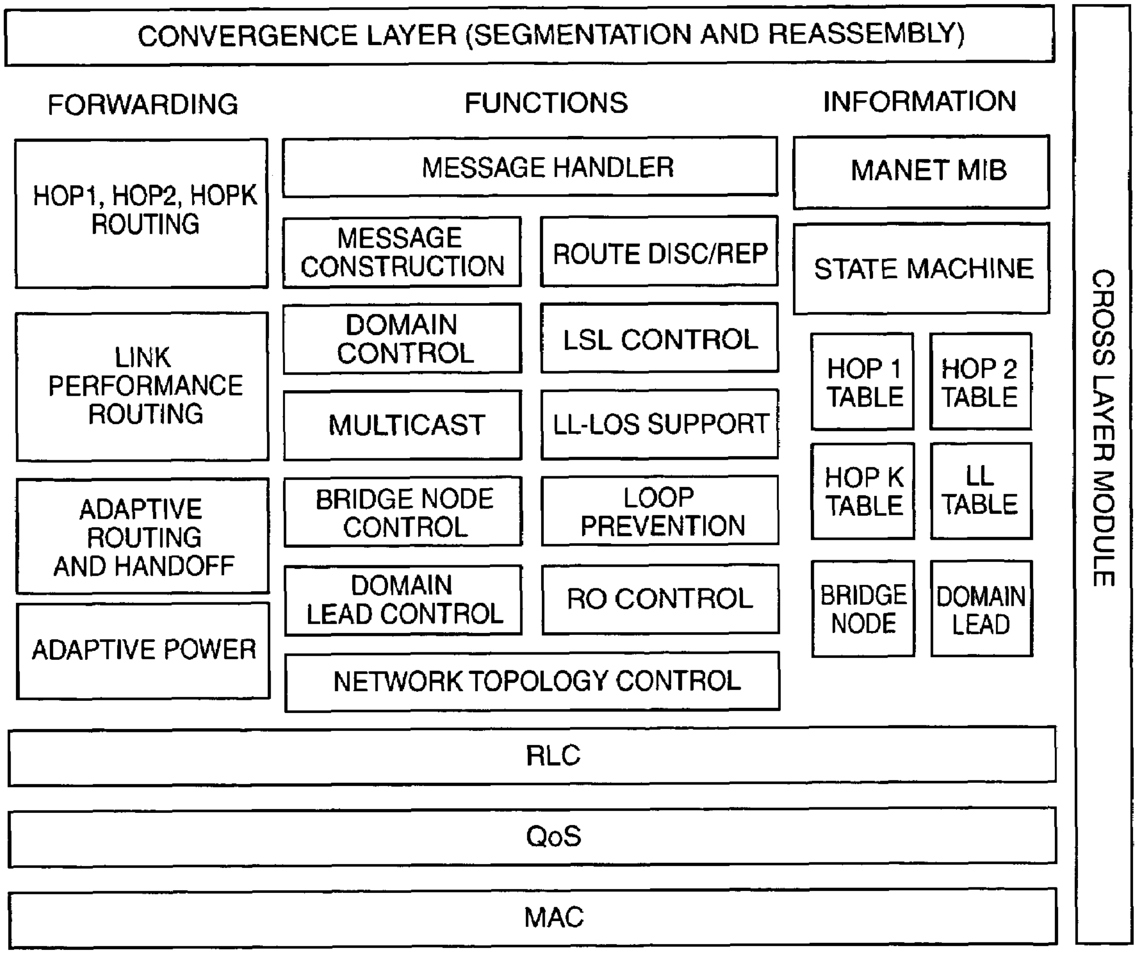
FIG. 1 is one example of a network stack implementation at a network node for carrying out the inventive routing protocol in a mobile ad hoc network (MANET)

The present invention concerns a network message routing protocol for use in mobile ad hoc networks (MANETs), especially MANETs deployed in tactical environments wherein the node topology of the network may change rapidly. Referred to herein as adaptive hybrid domain routing (AHDR), the protocol combines proactive and reactive components in such a manner that each node entering the network can readily obtain a current optimal route for messages destined to any other node in the network.

Basically, AHDR operates by forming a number of network domains each of which contains at least two nodes including a designated domain lead (DL) node. The nodes in each domain proactively exchange local routing information with one another at regular intervals. In addition, all DL nodes in the network inform one another periodically of the node topology in their respective domains. The rates at which the topology information is exchanged may also vary in order to minimize network control overhead while sufficiently updating the routing information available at each node.

Each node in a given domain selects a set of bridge nodes to provide the former with optimal coverage of nodes in neighboring domains. The reactive component of the protocol then allows a domain node to acquire unknown routing information on demand, for example, a route to another node that recently entered a remote part of the network and whose routing information has not yet propagated to the domain node's own domain. The bridge nodes link the domain node with nodes in other domains to obtain the desired routing information without significantly increasing the level of network control traffic.

AHDR may also operate to control the transmission power of each node and thus expand or reduce the one hop coverage of the node so as to adapt to certain network conditions. Because network control overhead as a percent of total available bandwidth depends on the number of nodes in each domain, such power control serves to manage domain membership and to reduce overhead. AHDR also supports a receive only (RO) mode of operation.

The following definitions apply to terms used herein to describe the inventive AHDR protocol.

Hop 1 (H1) Table:

A routing table configured at a given node and containing hop 1 information. Includes identifications (IDs) of all neighbor nodes within one hop (i.e., hearing distance) from the given node.

Hop 2 (H2) Table:

A routing table configured at a given node and containing hop 2 information. Includes IDs of all nodes that can be reached with 2 hops. This table also contains the address of a 1 hop neighbor through which the 2 hop node can be reached.

Hop K (Hk) Table:

A routing table configured at a given node that contains hop k>2 information, i.e., the IDs of nodes known to be beyond a range of 2 hops from the given node. The Hk table also contains the address of a 1 hop neighbor with which the given node can link to reach the distant node.

Topology Update 0 (TU0):

A message containing the ID of the originating node.

Topology Update 1 (TU1):

A message containing the ID of the originating node, the ID's of all 1 hop nodes entered in the H1 table of the originating node, and the ID (if available) of the domain lead (DL) node of the originating node's domain.

Link State Level (LSL):

A rating of, e.g., zero to 15 representing the quality of a transmission link for a given entry in a node's H1 or H2 table. LSL may be determined from Link Quality and Link Congestion, defined further below.

Zombie Node:

An isolated node out of range of any other node (i.e., a zombie node has no entries in its H1 table). A zombie node may broadcast a TU0 message periodically at intervals of $T_f$.

Free Node:

A node that detects messages originating from a neighboring node(s), but does not yet belong to a domain. A free node does not detect a domain lead (DL) node (see below) within a 1 hop range. A free node may broadcast a TU1 message periodically every $T_f$.

Domain Lead (DL) Node:

A node having the most coverage of its 1 hop neighbor nodes. The DL node may send a TU1 message every $2T_f$, and exchange network topology information with DL nodes of other domains in the form of topology update domain (TUd) messages. A node announces its DL status via a domain lead announcement (DLA) message to its neighbors. The former DL node renounces its DL status by broadcasting a domain lead renouncement (DLR) message to its neighbors.

Domain Node:

A node that is a member of a domain with at least one DL node within 1 hop range of itself. A domain node may broadcast a TU1 message every $2T_f$, and is able to issue Route Discovery (RDisc) messages and receive Route Resolution (RRes) messages as defined below.

Domain:

The region surrounding a DL node and containing all domain nodes within 1 hop distance from the DL node. That is, a DL node can reach all nodes contained within its domain via 1 hop, and vice versa.

Bridge Node:

A node belonging to a set of one or more nodes that are selected by a domain node (including a DL node). A bridge node acts to "bridge" a domain node that selected it with nodes in other domains of the network. Bridge nodes are selected strategically to maximize a domain node's ability to reach nodes in the other domains with minimal control overhead.

Link Node:

An intermediate node which is the next hop from a node that is originating or forwarding a message along a route to another node in the network.

Topology Update Domain (TUd):

A message exchanged among DL nodes throughout the network to disseminate information concerning nodes contained in the DL nodes' respective domains.

Route Discovery (RDisc):

A message transmitted by a domain node wishing to obtain a route to a desired destination node.

Route Resolution (RRes):

A message addressed to a domain node after a route to the desired destination node is resolved, in response to a RDisc Message from the domain node.

Network Entry:

An event that occurs once a node obtains information concerning neighboring nodes, and is able to reach all other nodes in the network on demand, i.e., the entering node has identified a DL node within 1 hop.

Figure 2:
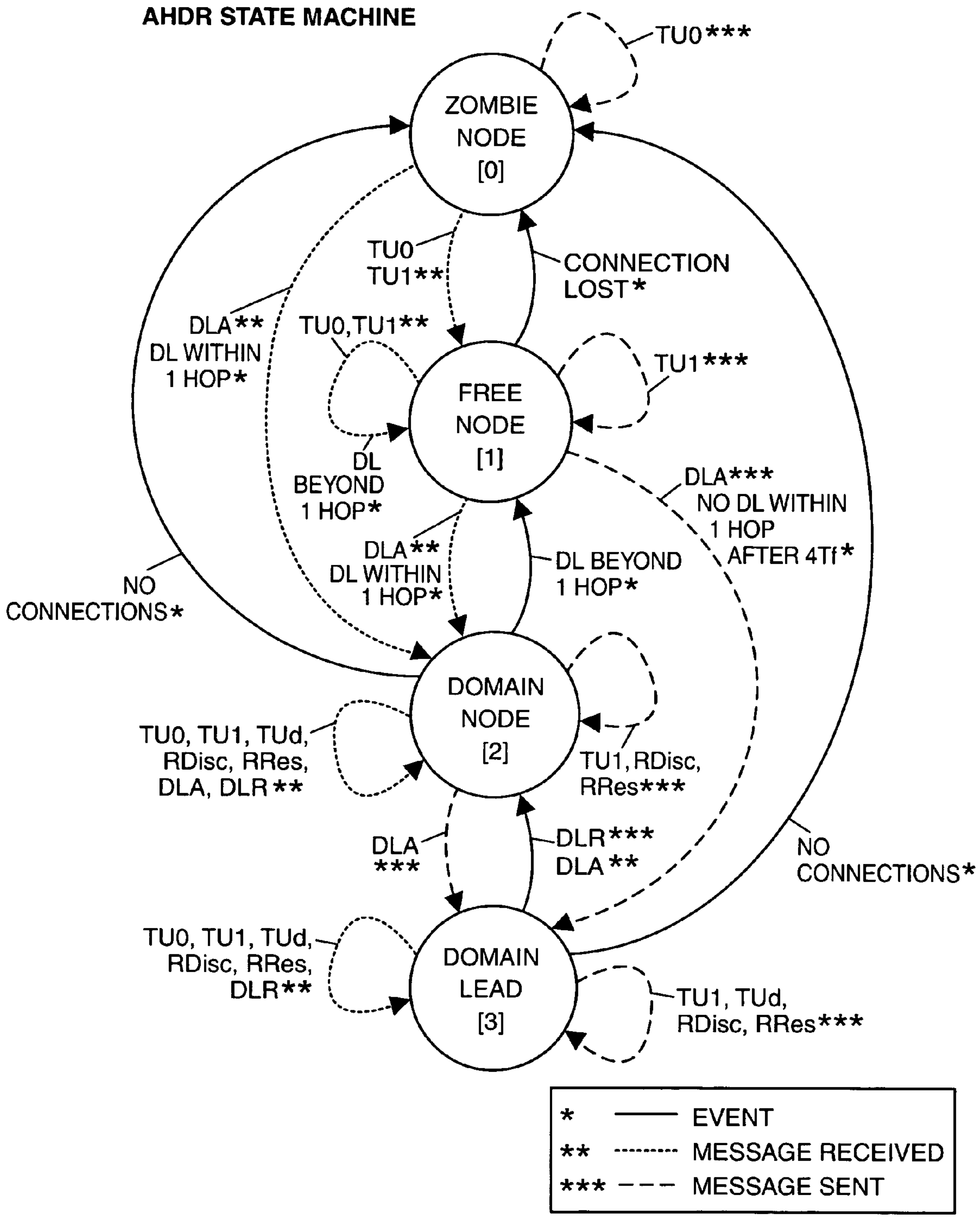
FIG. 2 is a state machine diagram of the inventive protocol.

FIG. 1 is an example of a network stack implementation at a network node for implementing AHDR according to the invention. FIG. 2 is a state machine diagram showing four normal states of a network whose nodes operate under the AHDR protocol, as described below.

A mobile node may gather link quality, link traffic congestion and logical connection information from lower layers of the network. For example, in the stack implementation in FIG. 1, a cross layer module (CLM) may derive an Internet protocol (IP) address from a medium access control (MAC) address, and assign the IP address to the node's network interface during initialization. The CLM module may be configured in a known manner to implement an IP to MAC address resolution for each outbound message from the mobile node. When the node enters or exits the network, the lower layers are notified by the CLM either to replace a specific target node, or to delete a specific target node as well as an associated message. Other possible implementations would be apparent to those skilled in the art based on the present disclosure.

Figure 3:
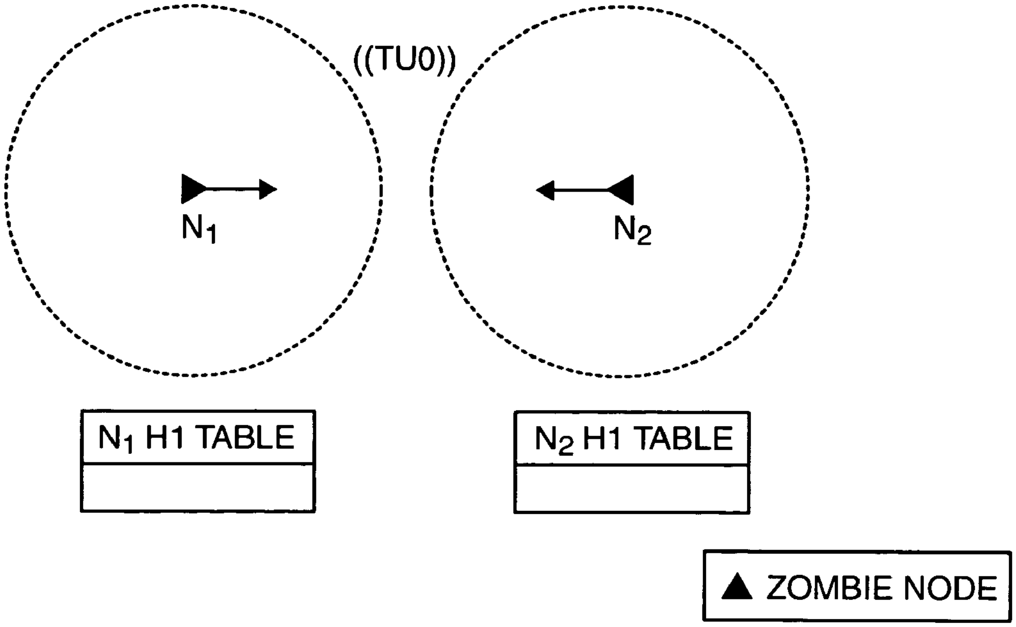
FIG. 3 depicts two mobile nodes approaching one another while in a "zombie" state.
Figure 4:
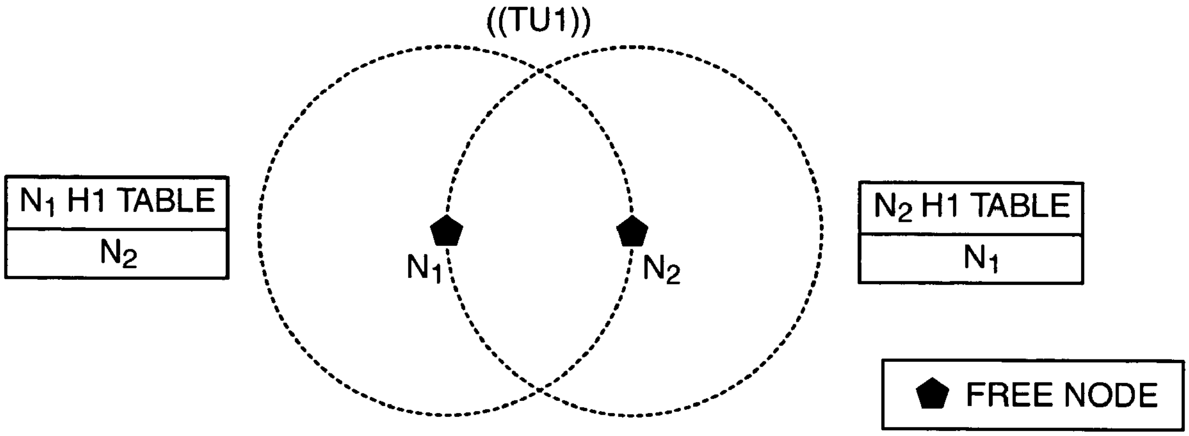
FIG. 4 shows the nodes in FIG. 3 assuming a "free" state.

Neighbor Detection and Network Formation (FIGS. 3 and 4)

At initialization, each of nodes N1 and N2 in FIG. 3 assumes a "zombie" state and remains in that state until one or more valid entries are entered in their local routing tables. For purposes of illustration, the transmission and reception coverage of either node is represented by a circle drawn around the node. It will be understood that a node's coverage may actually extend over a defined volume of space as in an airborne wireless ad hoc network.

While in the zombie state, each node broadcasts Topology Update Zero (TU0) messages at a rate of Tf wherein Tf is a unit of time, e.g., one second. The TU0 messages are broadcast until the zombie node detects a neighboring node. The neighbor node may be another zombie node which is also broadcasting a TU0 message, a free node, or a domain node broadcasting Topology Update One (TU1) messages. Upon detecting the neighbor node's message, the zombie node records the neighbor node's ID or address in its Hop 1 (H1) table, as shown in FIG. 4. The entries may also include an associated Link State Level (LSL) for the recorded node. When a zombie node's H1 table is no longer empty but lacks an address of a domain lead node, the zombie node attains the status of a "free" node and starts broadcasting TU1 messages that include the identities of its hop 1 neighbors. The TU1 messages may also be broadcast periodically at intervals of Tf.

Further details of the proactive routing tables at each of the nodes are set out below.

Figures 5, 6, 7:
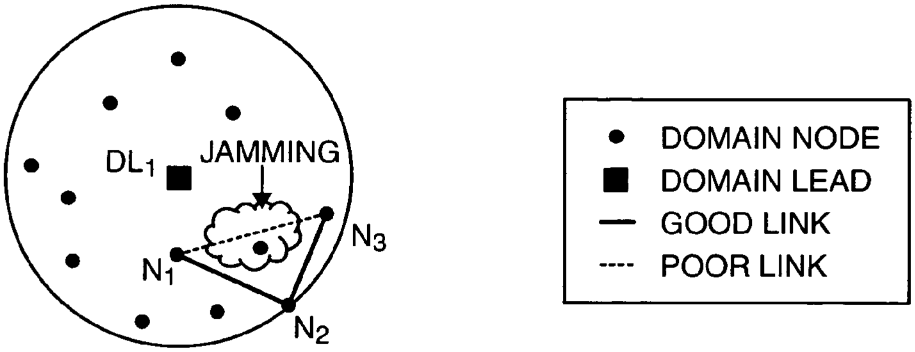
FIG. 5 is one example of a hop one (H1) table as configured at a given node.
FIG. 6 is one example of a hop two (H2) table as configured at a given node.
FIG. 7 represents a selection of a two hop route over a one hop route of lesser quality, per the inventive protocol.

Hop One (H1) Table (FIG. 5)

A node's H1 table is populated and updated each time the node receives a TU0 or a TU1 message from a neighboring node. The H1 table contains entries for each neighbor node within one hop range or distance. Each entry has, e.g., six fields, namely; Node ID, Link State Level (LSL), Node Coverage (NC), Domain Lead (DL), Neighboring Domain Coverage (NDC) and Timer. In FIG. 5;

Node ID: The source ID (SID) of the node sending the TU0 or the TU1 message.

LSL: A measure of the link condition between the local node and the node ID, and vice versa. Bi-directional values are represented in FIG. 5.

NC: The node coverage of the sending node.

NDC: The sending node's Neighboring Domain Coverage of a certain domain.

Link State Level (LSL)

The LSL for a one hop (H1) neighbor node may be measured and assigned by the network's MAC layer when the local node receives a TU1 message from the H1 node. The LSL may be defined by two factors; namely, a Link Quality Indicator (LQI) and a Link Congestion Indicator (LCI). Each factor may have, e.g., four levels; the higher the level, the better the transmission condition.

LQI may be calculated from, e.g., bit error rate, packet error rate, erasures count, acknowledged frames, and CRC error count. LCI may be calculated from, e.g., bits-per-second, packets-per-second, bit count, and packet count.

The overall LSL may then be represented at, for example, 16 levels as shown below:

| | LCI | | | |
|---|---|---|---|---|
| LQI | L4 (3) | L3 (2) | L2 (1) | L1 (0) |
| L4 (3) | 15 | 13 | 10 | 6 |
| L3 (2) | 14 | 11 | 7 | 3 |
| L2 (1) | 12 | 8 | 4 | 1 |
| L1 (0) | 9 | 5 | 2 | 0 |

Timer

Timer is used for counting a number of remaining time periods or intervals during which a given H1 table entry will be considered valid. For example, a counter may be initially set to four counts. An event may be declared non-responsive when, for example, a TU1 message is not received when expected from a neighbor node during a 2Tf interval, or a requested retransmission of a packet to the neighbor node fails. The counter is decremented by one for each non-responsive event. When the counter reaches zero, the corresponding node is removed from the local node's H1 table.

The counter may be reset to "4" upon each successful reception of a TU1 message from the neighbor node, or data transmission to the node.

Before deleting a neighbor node entry from a local node's H1 table, two conditions should be satisfied, namely:

Check the local H2 and Hk tables to determine if the neighbor node is entered in either table as a link to another node. If so, delete those entries as well.

Determine if the node associated with the non-responsive event can be added to the local node's H2 table. That is, attempt to establish a link node to the non-responsive node.

Hop Two (H2) Table (FIG. 6)

A node configures its H2 table from TU1 messages it receives containing H1 neighbor information for each sending node. The H1 data in the received TU1 messages, and the data in the receiving node's own H1 table, may overlap. Duplicate entries are disregarded but new entries may be inserted in the receiving node's H2 table. The H2 table may then have multiple entries for a single node ID. Each entry may have four fields, namely, Node ID, Link Node ID, LSL and Timer.

In FIG. 6:

Node ID: The ID of a H2 node as determined from a TU1 message received from a hop 1 neighbor.

The H2 node ID must not be in the H1 table of the receiving node, unless the LSL for the H2 node is below a certain threshold. The H2 node may then reside in both of the receiving node's H1 and H2 tables.

Link Node ID: The ID of the hop 1 neighbor that sent the TU1 message.

The Link Node ID must be in the H1 table of the given node.

As mentioned, a given node may be entered in both of the H1 and the H2 tables of another node. For example, in FIG. 7, if an existing link between 1 hop neighbors ($N_1$-$N_3$) is relatively poor compared to a possible 2 hop link to the same neighbor ($N_1$-$N_2$-$N_3$), AHDR will route non-time critical packets over the longer (two hop) route rather than the shorter route having a lesser link quality.

Figure 8:
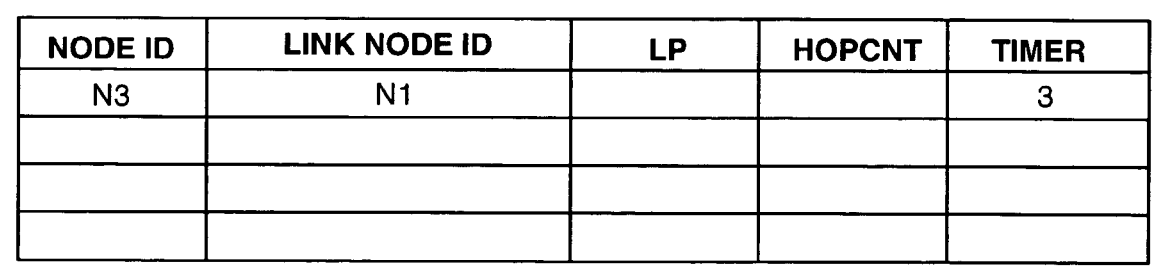

Hop K Table (FIG. 8)

When a node wants to send a message to a destination node whose address is not contained in either one of the sending node's H1 or H2 tables, the sending node checks its Hk Table. The Hk Table contains hop k>2 information, and has a format similar to the H2 table. In FIG. 8:

Node ID: Hop k>2 node ID as determined from a received TUd message or RRes message Link Node ID: A H1 node with which the local node can link to reach the Node ID LP: Link Performance between the local node and the Hop k>2 node.

HopCnt: Hop count

The Hk table of a node is configured and updated with each Route Resolution (RRes) message the node receives. If the RRes message was sent from the DL node of the receiving node's domain, the message may identify up to, e.g., three nodes with which the receiving node may link to reach the desired destination node.

Further details of the TU0, TU1 and TUd messages are given below.

Topology Update Zero (TU0) Message

A TU0 message is transmitted by a zombie node during network entry, and continues as long as the node does not detect messages from neighboring nodes. Thus, each TU0 message includes only the ID of the entering node. The format and content of a TU0 message may be as given below:

| Type | Len | SID | CRC |
|---|---|---|---|

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | Type | | | | | | | | Length | | | | | | | |
| 2 | State | | | | SID | | | | | | | | | | | |
| 3 | CRC | | | | | | | | | | | | | | | |

Type: Message Type

Length: Byte count of entire message

State: State of the node

SID: ID of the source node

CRC: Cyclic redundancy check-result of logical exclusive OR (XOR) operation on all words except self Topology Update One (TU1) Message TU1 messages are transmitted by free nodes and by domain nodes in order to exchange their one hop neighbor information as entered in their routing tables. Each message includes the ID of the sending node, the IDs of its 1 hop neighbors, and the ID of the sending node's domain lead node (if available).

Figure 9:
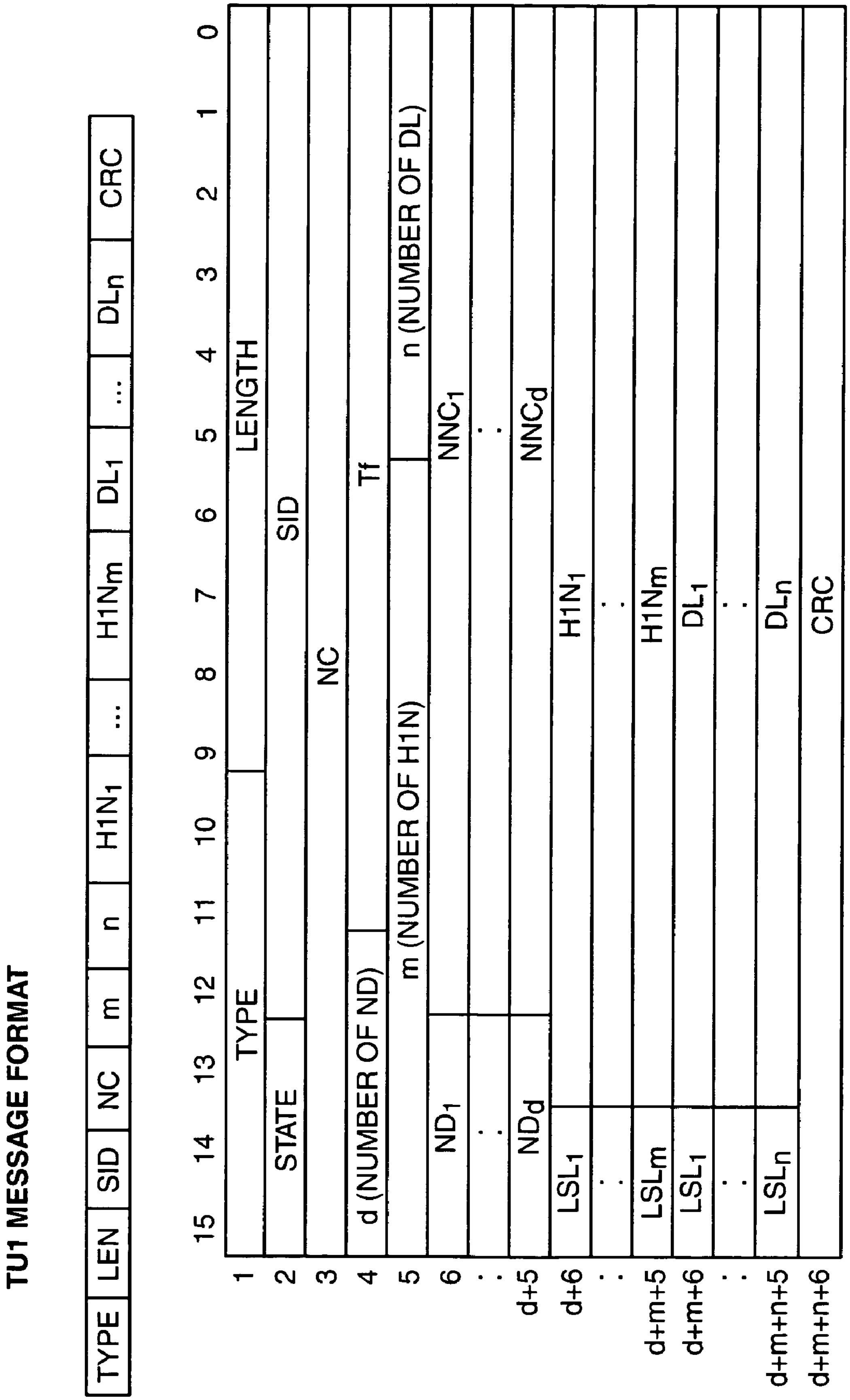
FIG. 9 shows one example of the format of a topology update one (TU1) message according to the inventive protocol.

A typical TU1 message format is shown in FIG. 9. In the figure;

NC: Node Coverage m and n make up the fifth word.

m=number of H1N—hop 1 node IDs in the message n=number of DL—Domain Lead IDs in the message Each H1$N_k$ (k=1, m) word contains 2 sub fields.

H1$N_k$—hop 1 node ID

LSLk—Link State Level from SID to H1$N_k$ as measured, e.g., by the MAC layer of the sending node.

Each $DL_k$ (k=1, n) word contains 2 sub fields.

$DL_k$—is the Domain Lead ID $LSL_k$—Link State Level from SID to $DL_k$. May be measured by the MAC layer, as above.

CRC—Cyclic Redundancy Check

Figure 10:
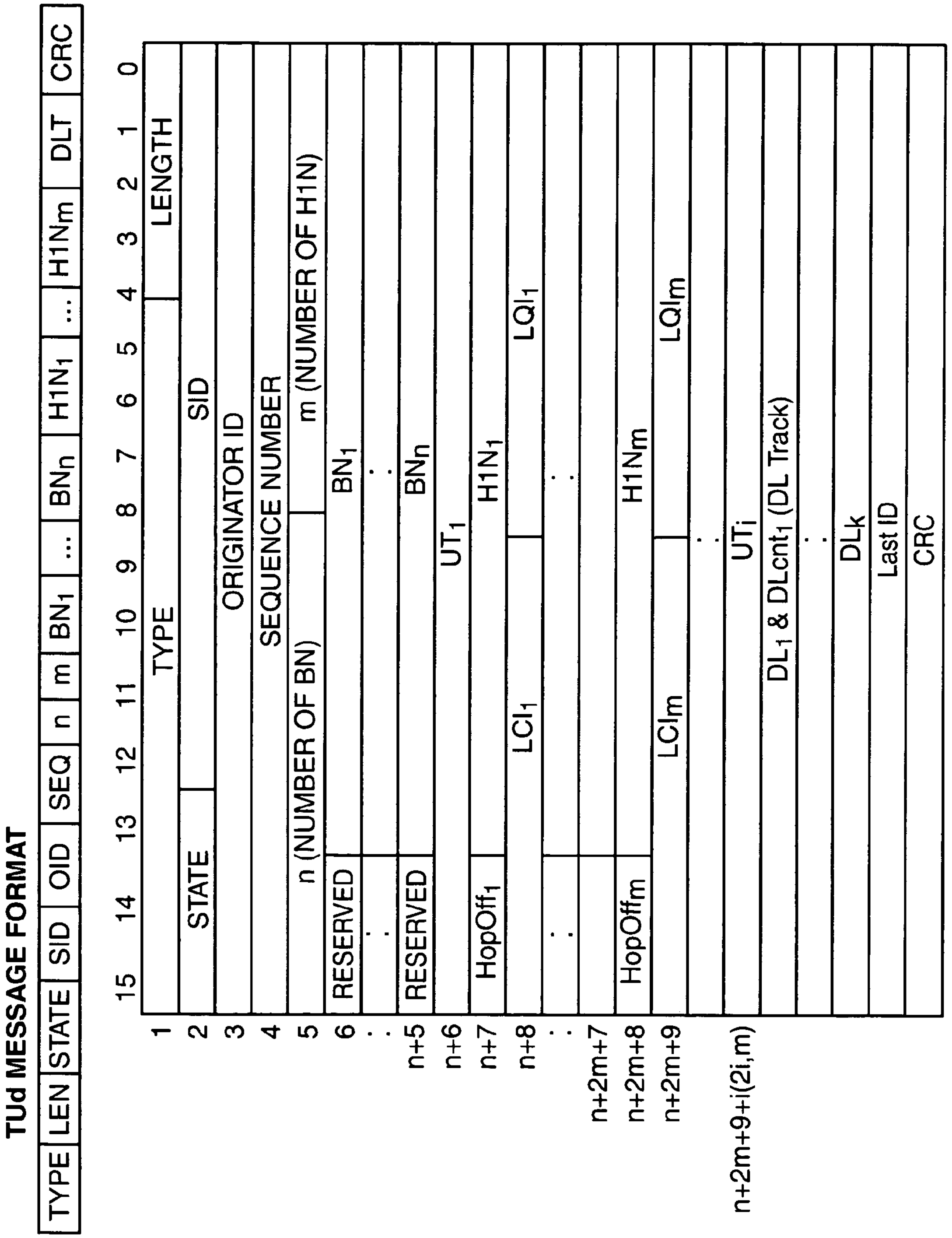
FIG. 10 shows one example of the format of a topology update domain (TUd) message according to the inventive protocol.

Topology Update Domain (TUd) Message (FIG. 10)

The periodic exchange of the TUd messages provides network topology information to all domain lead nodes in the network on an inter-domain level. Each DL node thus "represents" all of the domain nodes that selected it. To limit network control overhead, inter-domain TUd message updates may contain only those H1 neighbors that selected the source DL node as their primary DL node. This may avoid multiple TUd message entries for a single node in overlapping domains.

Figure 11:
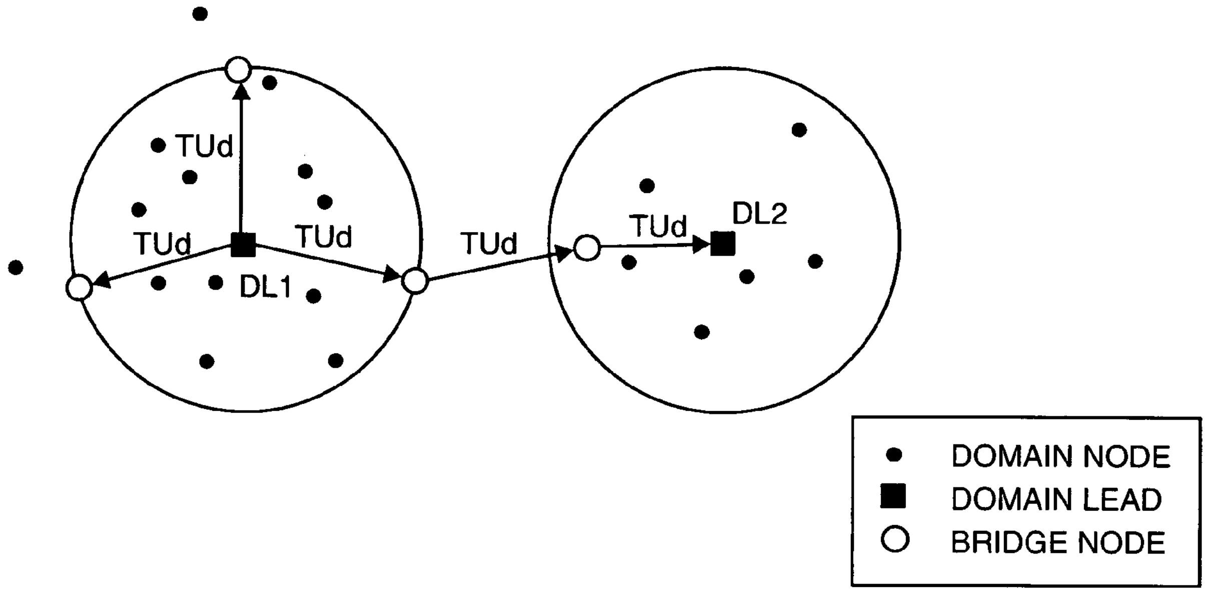
FIG. 11 illustrates the forwarding of a TUd message from a domain lead (DL) node through a selected set of bridge nodes according to the inventive protocol.

Each DL node multicasts its TUd messages to the DL node's selected bridge nodes (BNs) at intervals of, for example, every 10 Tf. See FIG. 11. Upon receiving a TUd message, each bridge node forwards the message to all DL nodes (if any) entered in the BN's H1 table, as well as to all of the BN's own selected bridge nodes. The IDs of the DL nodes associated with the BNs are included in the TUd message at each hop to enable loop free message propagation. That is, once the ID of a DL node is appended to a TUd message, the domain associated with the identified DL node is considered a "covered" domain. Each BN may then check the list of covered domains, and refrain from multicasting the received TUd message into the covered domains. A propagation cancellation counter may also be provided such that after a message bounces around within a domain a certain number of times (e.g., default=3), the message is discarded.

The time to populate the entire network with TUd messages varies depending on the scale of the network. To reduce control overhead, the TUd messages are preferably transmitted by each DL node with relatively long intervals (for example, default=10Tf), wherein, e.g., every third TUd message is complete while intervening updates only inform about changes in topology of nodes in the sending DL node's domain.

In FIG. 10;

Length: Byte count of entire message

SID: Sender ID

OID: Originator ID—the node that generated the original message. This field is not necessarily the same as the "Sender ID" which conveys the address of the node forwarding the message.

Seq: A unique identification number generated by the message originator for each message. The sequence number is increased by 1 for each message generated by the originator.

n: the number of Bridge Node IDs in the message m: the number of hop 1 neighbor IDs Each $BN_k$ (k=1, n) word contains 2 sub fields.

- $BN_k$—Bridge Node ID
- $LSL_k$—Link State Level from SID to $BN_k$ as measured, e.g., by the MAC layer of the sending node.

Each $H1N_k$ (k=l, m) word contains 2 sub fields.

- $H1N_k$—hop 1 node ID
- UTk—Update Type—New, delete, initialization, or refresh.

DL Track: A record of the domains to which the message has propagated—

- Each new hop adds a new entry containing the SID of the domain lead node in the domain
- Each hop adds to the DL counter (DLcnt)—the sum of all DLcnt results in the total number of hops traversed CRC: Cyclic redundancy check

Network Entry

Network entry occurs when a node enters an existing network and becomes integrated into the routing tables of nearby nodes. The following conditions should be met:

(1) The entering node has been added to the routing table of at least one other node that is a member of the entered domain.

(2) The entering node becomes aware of neighboring domain nodes, i.e., the entering node lists at least one other domain node in its H1 table.

(3) The entering node's neighbors include at least one domain lead (DL) node that becomes listed in either the H1 or the H2 table of the entering node.

After achieving network entry, the entering node may send and receive messages, route and transfer data, and issue a Route Discovery message for unknown routes.

Figure 12:
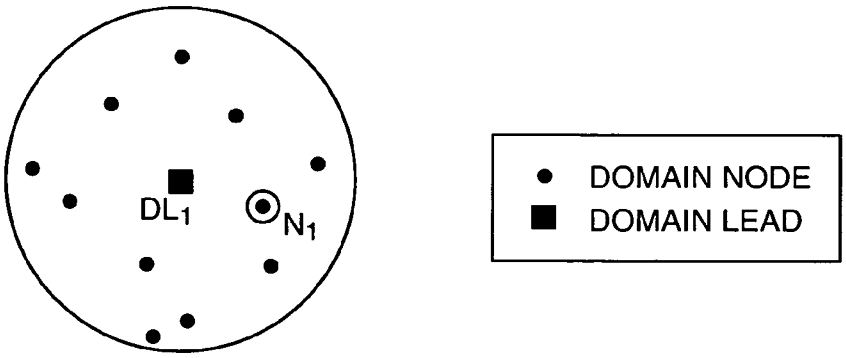
Figure 13D:
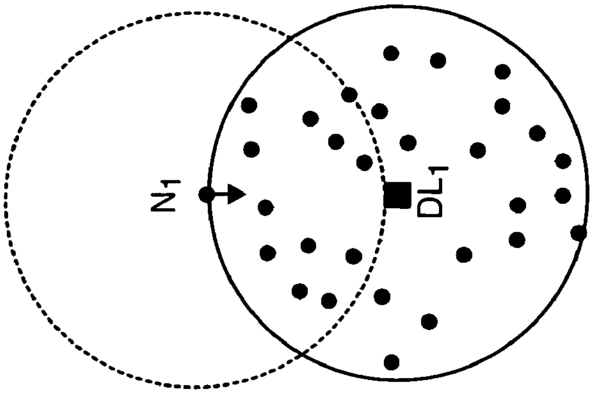
FIGS. 13(*a*) to 13(*d*) show changes in the state of a node entering a network under the inventive protocol.
Figure 13C:
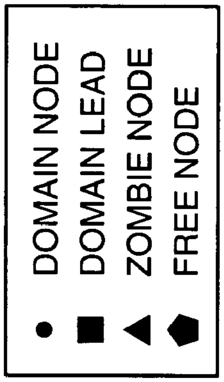
Figure 13C:
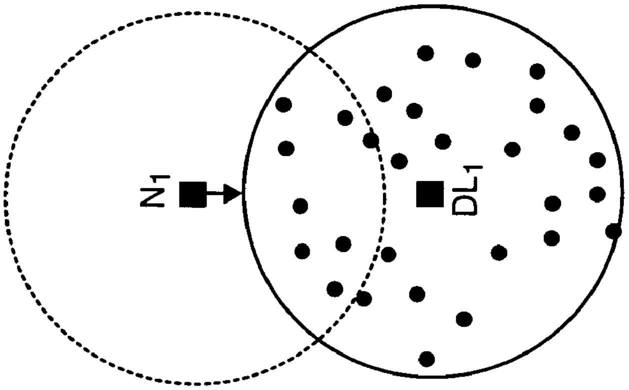
Figure 13B:
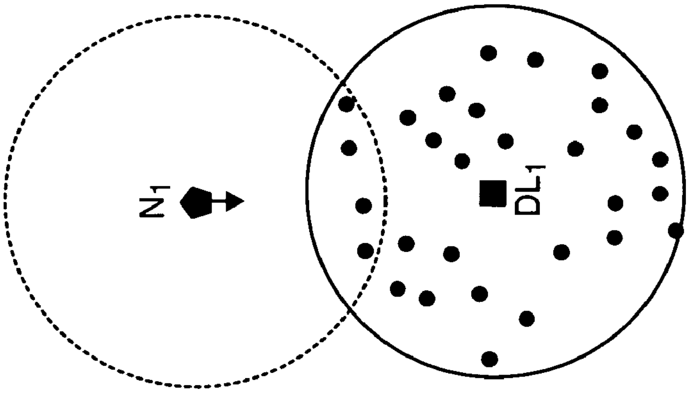
Figure 13A:
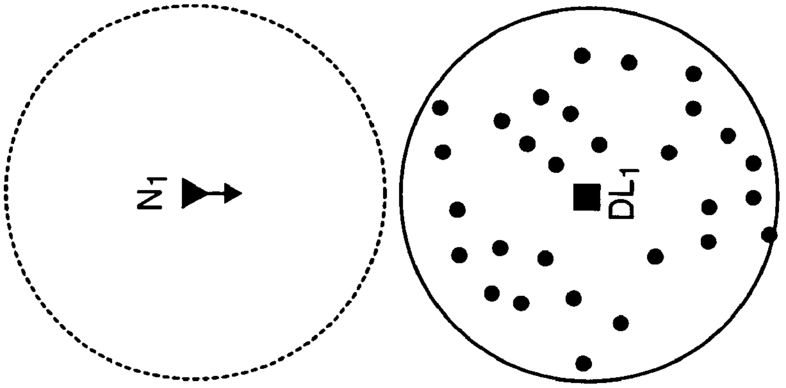

Network Entry at Power Up (FIG. 12)

When a node powers up and enters a network under AHDR, it may take an interval of up to 2Tf for the node to receive a TU1 message from all its neighbor nodes, including the DL node of the domain which the node has entered. At the end of 2Tf, all nodes within 1 hop range of the newly entered node will have broadcast their TU1 messages, leaving the H1 and the H2 tables of the entering node currently updated.

Network Entry as a Zombie Node (FIGS. 13(*a*) to 13(*d*))

When node N1 approaches an existing network as a zombie node in FIG. 13(*a*), the node first detects peripheral nodes of the network and its H1 and H2 tables become populated as it receives TU1 messages from neighboring nodes. If no domain lead node is within 1 hop range, node N1 becomes a free node as in FIG. 13(*b*) and competes for DL node status with the remaining 1 hop neighbors.

After another period of 2Tf, node $N_1$ designates itself a DL node if there is no other DL node within a 1 hop distance. See FIG. 13(*c*).

If node $N_1$ approaches the network and detects domain lead node DL1 within a 2 hop range, node $N_1$ simply enters of the network and assumes domain node status as in FIG. 13(*d*).

If, after designating itself a DL, node $N_1$ enters a domain having a DL node, node N1's status may be contested. If the domain's DL node has a higher node coverage than node $N_1$, node $N_1$ would then issue a DLR message renouncing its self-designated DL status.

Link Sensing and Symmetrical Links

When a node receives a message, it calculates a Link State Level (LSL) which represents the transmission condition between the sending node and the local (receiving) node. The LSL may be based on metrics at the receiving node such as received signal strength and current congestion at the receiving node. A received TU1 message may then contain information concerning link quality and neighbor node congestion for the one way link from the sender to the receiver. Therefore, after a node transmits either a TU0 or TU1 message and the same node later receives a TU1 message containing a LSL value associated with the SID of a hop 1 neighbor node, the link is confirmed and a symmetric link is defined between the nodes. Preferably, an entry in a node's H1 table remains only if the there is a symmetric link between the node and the corresponding 1 hop neighbor. Otherwise, node N2 may attempt to send future messages to node N1 even though node N1 would not receive them. The LSL of the neighbor may have a value of zero until a symmetric link is confirmed.

Figure 14:
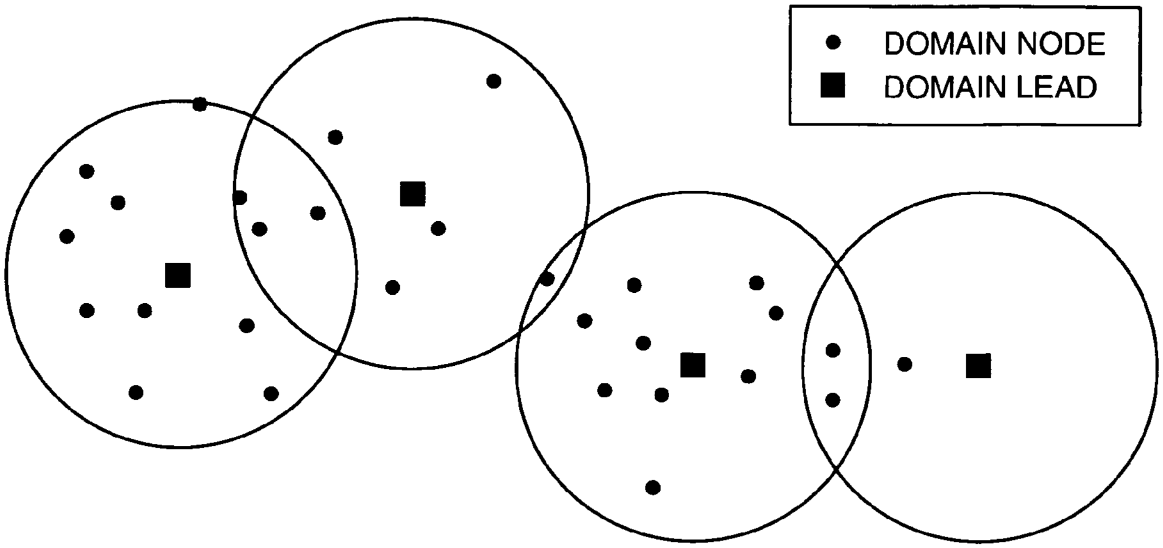
FIGS. 14 and 15 illustrate the formation of a domain according to the inventive protocol.
Figure 15:
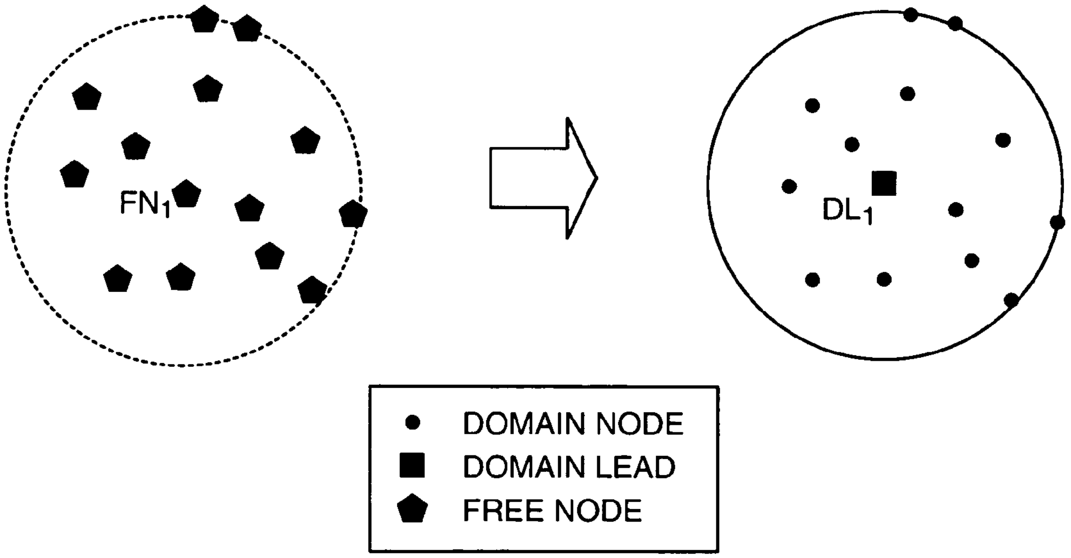

Domain Formation (FIGS. 14 and 15)

The AHDR protocol operates to form a number of logical domains in a network, some of which may overlap spatially. See FIG. 14. As mentioned, a free node that has the greatest one hop node coverage among its neighbors announces itself as a domain lead (DL) node. Initial network formation occurs once nodes that are within one hop range of the DL node acknowledge the latter as their domain lead node, subject to the condition that none of the one hop neighbors is already a DL node. See FIG. 15.

Domain Lead Announcement (DLA) Message and Acknowledgment

Nodes compete on a regular basis with their neighbors for the designation of Domain Lead. Each node periodically broadcasts a TU1 message containing its one hop neighbor information, and compares its own node coverage with that of neighboring nodes. A given node's coverage may be determined in terms of, e.g., a weighted function derived from the number of hop 1 nodes within range of the given node, and corresponding LSL values associated with each one hop neighbor.

Once a free node or an existing domain node determines it should have the status of domain lead, it transmits a domain lead announcement (DLA) message. After the announcement is acknowledged, all free nodes within range of the DL node's message acquire the status of domain nodes.

Domain nodes acknowledge the announced DL node by including the ID of the DL node in TU1 messages later broadcast by the domain nodes as shown in FIG. 9. A domain node may hear up to, e.g., three domain leads but selects only one as its primary DL node. If two or more potential DL nodes within range of one another have identical node coverage, the node with, e.g., the lower SID may be selected as the DL node.

Each domain node continuously evaluates its one hop node coverage against that of the current domain lead node. When a domain node's coverage surpasses that of the current DL node by, for example, ten percent, the domain node broadcasts a DLA message to challenge the status of the current DL node. An example of the DLA message format and content is given below:

DLA Message Format

| Type | Len | SID | CRC |

| 15 14 13 12 11 10 9 8 7 6 5 4 3 2 1 0 | |
|---|---|
| 1 | Type | Length |
| 2 | state | SID |
| 3 | CRC |

Figure 16:
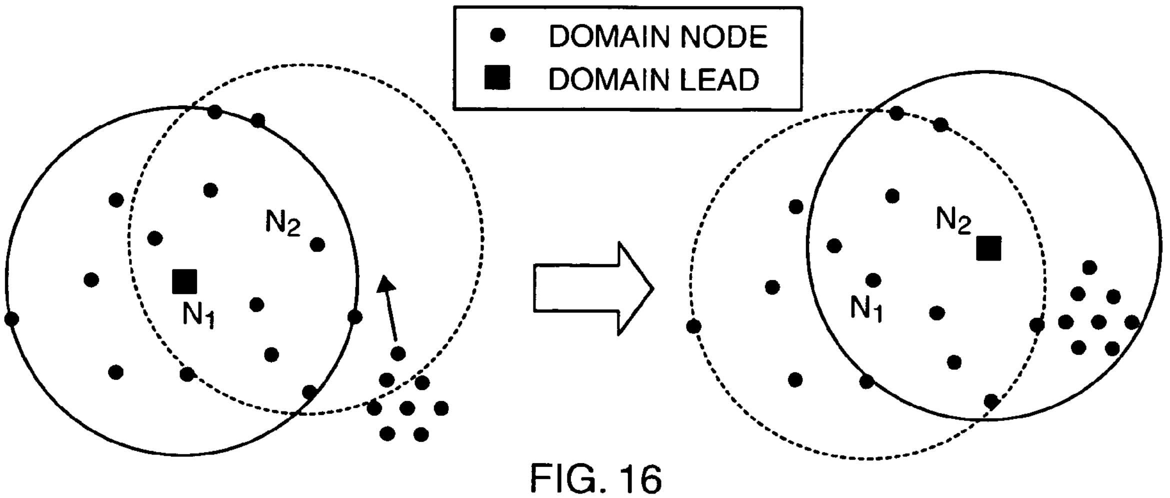
FIG. 16 illustrates a scenario of an announcement message from a new domain lead node with a corresponding renouncement message from a former domain lead node.

Type: Message Type (DL announcement)
Length: Byte count of entire message
SID: ID of the node announcing itself as a Domain Lead
CRC: Cyclic redundancy check Domain Lead Renouncement (FIG. 16)

As mentioned, when a domain node determines that its node coverage exceeds that of a current DL node by a certain threshold, the node broadcasts a domain lead announcement (DLA) message. The current DL node then acknowledges the DLA message by expressly renouncing its DL status through a domain lead renouncement (DLR) message. As seen in FIG. 16, node N1 broadcasts a DLR message upon reception of a DLA message from node N2. The DLR message includes the ID of the new DL node. Whenever a domain node receives a DLR message, the following steps may be taken:

(1) The domain node removes the ID of the renouncing node from a local DL table at the domain node, only after the domain node hears the DLR message from the replaced DL node acknowledging the DLA message sent by the newly designated DL node.

(2) When a preset time period for a DL node entry times out, the DL node is removed from the DL table.

If a domain node's DL entry times out, and the node's DL table becomes empty, the domain node reverts to the status of a free node The free node then competes with other free nodes to become a DL node. If the free node is the only node without an associated DL node, it designates itself as a DL node after a certain time period, e.g., 2Tf.

(3) To avoid frequent changes in the identity of DL nodes, and possible contention between two or more neighboring free nodes, a practical Node Coverage threshold is established A value of, for example, ten percent may be used as a default.

Figure 17:
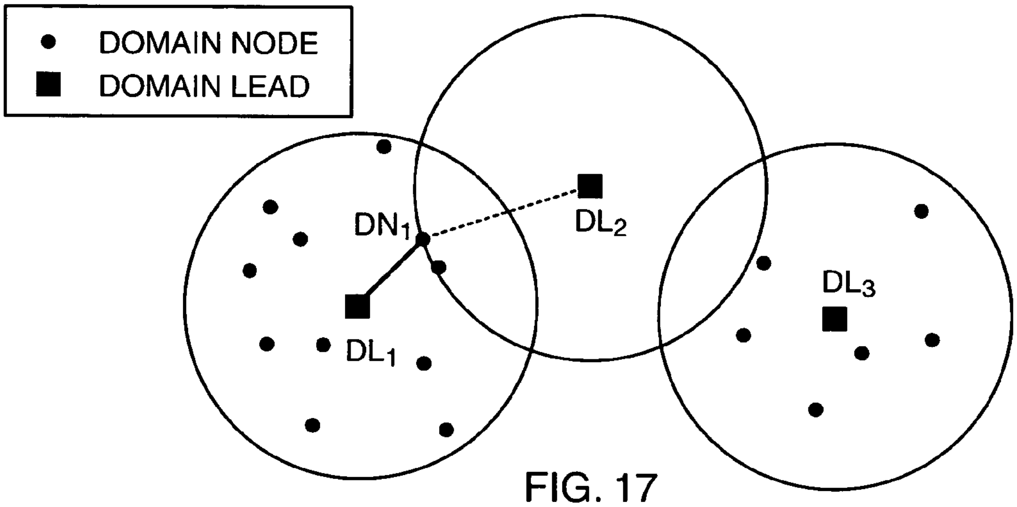
FIG. 17 shows a scenario of a domain node selecting a primary domain lead node and a secondary domain lead node.

(4) If a domain node is within range of more than one domain, it may hear two or more DLA messages without hearing a DLR message. See FIG. 17.

Each domain node then designates the DL node whose DLA message has the greatest LSL as its primary DL node, and those nodes that broadcast the remaining DLA messages as a secondary DL node.

The entries in the domain node's DL Table are ordered by LSL.

(5) The ID of the primary DL node is the first listed DL node in the domain node's TU1 messages.

Tracking multiple DL nodes within range provides for quick adaptability in a network characterized by frequent changes in node topology. When a domain node starts moving out of range of its primary DL node, a secondary DL node becomes a primary DL node once the secondary DL node's LSL surpasses that of a current primary DL node.

Preferably, each DL node also maintains a local table of all domain nodes that selected it as their primary DL node.

DLR Message Format

As mentioned, a DLR message is broadcast by a DL node about to be replaced by a new DL node. The former DL node may then pass the current entries in its hop k>2 table to the new DL node. Every domain node preferably updates its own Hk>2 table accordingly.

| Type | Len | SID | NDL | CRC |

| 15 14 13 12 11 10 9 8 7 6 5 4 3 2 1 0 | |
|---|---|
| 1 | Type | Length |
| 2 | state | SID |
| 3 | New Domain Lead |
| 4 | CRC |

Figure 18:
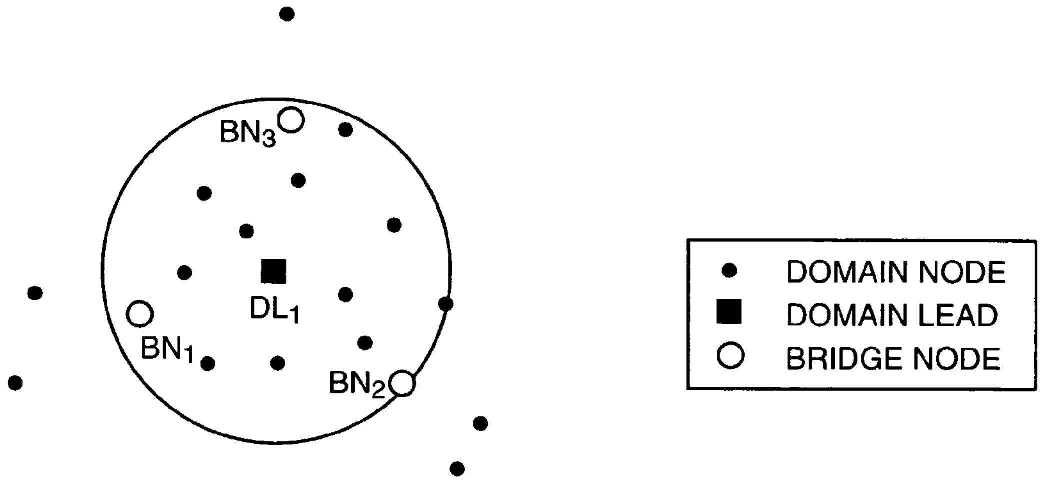
FIG. 18 depicts the selection of a set of bridge nodes by a domain lead node.

Type: Message type (DL renouncement)
Length: Byte count of entire message
SID: ID of the Domain Lead that is renouncing itself
NDL: New Domain Lead ID which the source (old Domain Lead node) is acknowledging
CRC: Cyclic redundancy check Bridge Node Selection (FIG. 18)

Bridge nodes are located at or near the periphery of a domain. They act to extend the reach of the domain nodes that select them by "bridging" each of the domain nodes with nodes in adjacent domains. Bridge nodes are used for control message distribution in the domain architecture. That is, instead of flooding information throughout the entire network, messages may be multicast from an originating or source node to its selected bridge nodes, thus achieving maximum coverage throughout the network with minimal overhead. A bridge node may also be used for user data transport if it is determined as the best next hop. Each domain node, including the domain lead, may select its own set of bridge nodes according to the following criteria:

1. Each bridge node must be a current entry in the selecting domain node's H1 table.

2. The selected set of bridge nodes should provide the best links for routing messages between the domain node and nodes in the neighboring domains.

3. The set contains one BN for each neighboring domain.

4. The BN for each neighbor domain should have the highest Neighboring Domain Coverage (NDC) of nodes contained in the neighbor domain.

Multicasting by a domain node through its selected set of bridge nodes allows queries to be forwarded outward and away from the domain node, and achieves greatest distance per hop. Routing messages through the bridge nodes also directs data packets toward a portion of the network in which the destination node is located, since the bridge nodes are selected as being the least number of nodes that will cover all links from the domain node to nodes in all other domains of the network.

Since each domain node selects its own set of bridge nodes, a BN selected by one domain node may also act as a BN for one or more other domain nodes. It is unlikely, however, that a number of domain nodes will each select the same set of bridge nodes and thus create a "bottleneck" for outgoing messages. While each domain node maintains a table of its selected bridge nodes, the bridge nodes do not require specific knowledge of the domain nodes that selected them.

Bridge Node Selection by a Domain Lead Node

A DL node selects its set of bridge nodes according to the following criteria:

(1) The bridge nodes are the set of nodes having the highest NDC of one or more neighboring domain lead nodes.

H1 data exchange must include the DL node of the H1 neighbors and the node's own NC for each neighboring domain (2) If two nodes have equal NDC to a certain domain, the node with the lower SID is selected.

Routing Strategy and Protocol

Every node in the network that implements AHDR is preferably equipped to operate as a host or a router. The proactive routing component of the protocol provides each node with a detailed and updated view of the surrounding node topology.

AHDR determines an appropriate 1 hop neighbor with which a given domain node can link to reach a desired destination node. This neighbor node may be referred to as a "target" node. Target node determination depends on the node topology surrounding the sending node, and is preferably made on a per-packet basis. This minimizes the likelihood of using stale paths and allows individual message data packets to follow an optimal next hop path to their destination at the time of transmission. The Hop 1 (H1), Hop 2 (H2), and Hop k>2 (Hk) routing tables are updated at each node, and are sorted by LSL or LP to determine the optimal next hop link. After initial network formation, message routing from a source node to a destination node proceeds as follows:

Single-Hop Routing

Single-hop routing occurs when the source and the destination nodes are within 1 hop from one another. This local transfer between the two nodes does not require an intermediate linking node since, by definition, every 1 hop neighbor of the source node is within hearing range of the latter and a direct link between the source and the destination nodes can be achieved. Thus, if the ID of the destination node is found in the source node's H1 table, then the destination node is set to be the target node.

Multi-Hop Routing

Multi-hop routing is performed when a node originating a message and the desired destination node are beyond one hop from one another. Although each domain node maintains an updated H2 table identifying all neighbors within 2 hops, there may be multiple routes to a given 2 hop neighbor. Accordingly, up to, e.g., three link nodes are maintained in the routing tables for each route beyond one hop. The link nodes may be ordered by Link Performance (LP), which is calculated from the cost per route. The LP cost of the route may be resolved from QoS statistics such as the link congestion, link quality, and hop count. Each successive hop over the route is selected depending on the message type, priority and QoS measures. AHDR may also use information obtained from location based and/or situational awareness services to assist with route optimization.

If the destination node ID is not entered in the sending or source node's H1 table, then the H2 table is scanned. If the destination node ID is found, then the ID of the associated next hop (target) node is obtained. Note:

When a node selects the next hop, it does so based on the end-to-end quality of the path and not the link between itself and the next node.

Multiple paths may exist between 2 nodes, and AHDR may choose to route data through a path where some individual links making up the path may not have the best quality, but together provide the best overall path for meeting QoS requirements for the data, The target node may be determined by a Link Performance value, representing an optimal route based on QoS of packets.

Link Performance (LP) may be derived from a weighted sum of a combination of statistics including the following:

- Link State Level (LSL)—a function of Link Quality and Link Congestion
- Operational state of the 1-hop neighbor node (i.e., free node, domain node, or DL node); stability of the link between the sending node and its 1 hop neighbor If the destination node ID is not within the source node's H2 table, then the Hk table is scanned. If the destination node ID is present, then an optimal target node is determined.

Link Performance is derived from a weighted sum of a combination of statistics, which may include the following:

- Link State Level (LSL)—a function of Link Quality and Link Congestion
- Per Hop Behavior (PHB)
- Number of Hops Information from location based or situational awareness services may be used to help with route optimization.

If the destination node ID is not found in the Hk table of the source node, then the node issues a Route Discovery (RDisc) message to the DL node of its domain and waits for a responsive Route Resolution (RRes) message.

As discussed later below, the spatial size or volume of network domains under AHDR can be adjusted to limit or expand the number of one-hop entries that a node obtains for its H1 table, in order to adapt to a wide variety of network scenarios.

H2 Link Performance (LP) Routing

Each node derives a list of its hop 2 neighbor nodes, based on entries in its H1 table and the H1 information received by the node in TU1 messages from its neighbors. Subsequent TU1 messages may provide information for a hop 2 node already entered in the node's H2 table. That is, there may be more than one target node for reaching the same hop 2 node. This allows for the determination of multiple routes between the same nodes, and for the selection of a route based on its overall transmission quality as well as its level of congestion.

$LSL_{1k}$ is the LSL in the H1 table (from the source node to link node). k=1, 2 . . . n (n=number of different links to the hop 2 node)

$LSL_{2k}$ is the LSL from the link node to the destination, k=1, 2 . . . n.

LP is the total Link Performance of the route to the hop 2 node, taken from the lower of the $LSL_{1k}$ and $LSL_{2k}$ values.

$$LP=(LSL_{1k}+LSL_{2k}),MIN(LSL_{1k}, LSL_{2k})$$
$$k=1, 2 \ldots n$$

The LP of multiple routes to a particular destination node are preferably ordered with the best LP first.

Loop Free Propagation and Elimination of Redundancy

TUd messages may include a combination of a message sequence number and an originator ID, for ensuring that a given message is not retransmitted more than once by any given node. The sequence number is a unique ID number generated by the originator of the message, and a sequence number counter may be incremented before each broadcast by the originator. A multicast message through bridge nodes, such as a TUd message, embeds the bridge node IDs within the payload of a broadcast MAC frame. Every node within 1 hop distance will receive the message, and only a first set of bridge nodes whose ID's are included in the message will forward the message to a possible Domain Lead, as well as to other nodes that were selected as bridge nodes by and for the first set of bridge nodes.

Since each node has its own set of bridge nodes, a TUd message may bounce back and forth within a domain several times before propagating outward. To prevent redundant dissemination and loops along the message route, the DL node of each intermediate BN is tracked in the TUd message, and the number of times the message is allowed to propagate within a single domain is limited, thus reducing overhead.

The originating node ID is the ID of the DL node issuing the TUd message. Therefore, after the first TUd message is multicast to the DL node's BNs, the BNs will not send the TUd to any of their BNs that have the originating node's ID in their H1 table.

Route Discovery and Resolution

As mentioned, when a source node wants to send a message to a known destination node, it first searches its routing tables for the desired node. If the destination node is beyond 2 hops and no route can be determined from the current table entries, then the source node relies on the reactive component of AHDR in which the domain lead and the bridge nodes have a role. Specifically, the source node generates a Route Discovery (RDisc) message and sends it to the DL node. The source node then waits for a Route Resolution (RRes) reply message from the DL node.

When the DL node receives the RDisc message, it acts as follows:

If the DL node can locate the destination node within its own routing tables (H1, H2, or Hk), it generates a RRes message for the source node. The RRes message specifies, inter alia, a target node with which the source node can link in order to reach the destination node.

If the DL node cannot locate the destination node in its own routing tables, it forwards the RDisc message to the DL node's selected bridge nodes.

When the bridge nodes receive the RDisc message from the DL node, they act as follows:

If a BN can locate the destination node within its own routing tables, it generates a RRes message and transmits it to the LastID (i.e., the DL node that forwarded the RDisc message). The bridge node also forwards the RDisc message to the destination node.

If the BN cannot locate the destination node within its routing tables, it forwards the RDisc message to all domain lead nodes within 2 hops, unless such a DL node was the LastID of the received message, or is already listed in the RDisc message.

An intermediate DL node that receives a forwarded RDisc message, acts as follows:

If the intermediate DL node can locate the destination node within its routing tables, it generates a RRes message and sends it to the LastID (i.e., the previous hop node). The RDisc message is also forwarded to the destination node.

If the DL node cannot locate the destination node within its routing tables, it forwards the RDisc message to all of its selected bridge nodes, except for a BN that was the LastID of the RDisc message.

Figure 19:
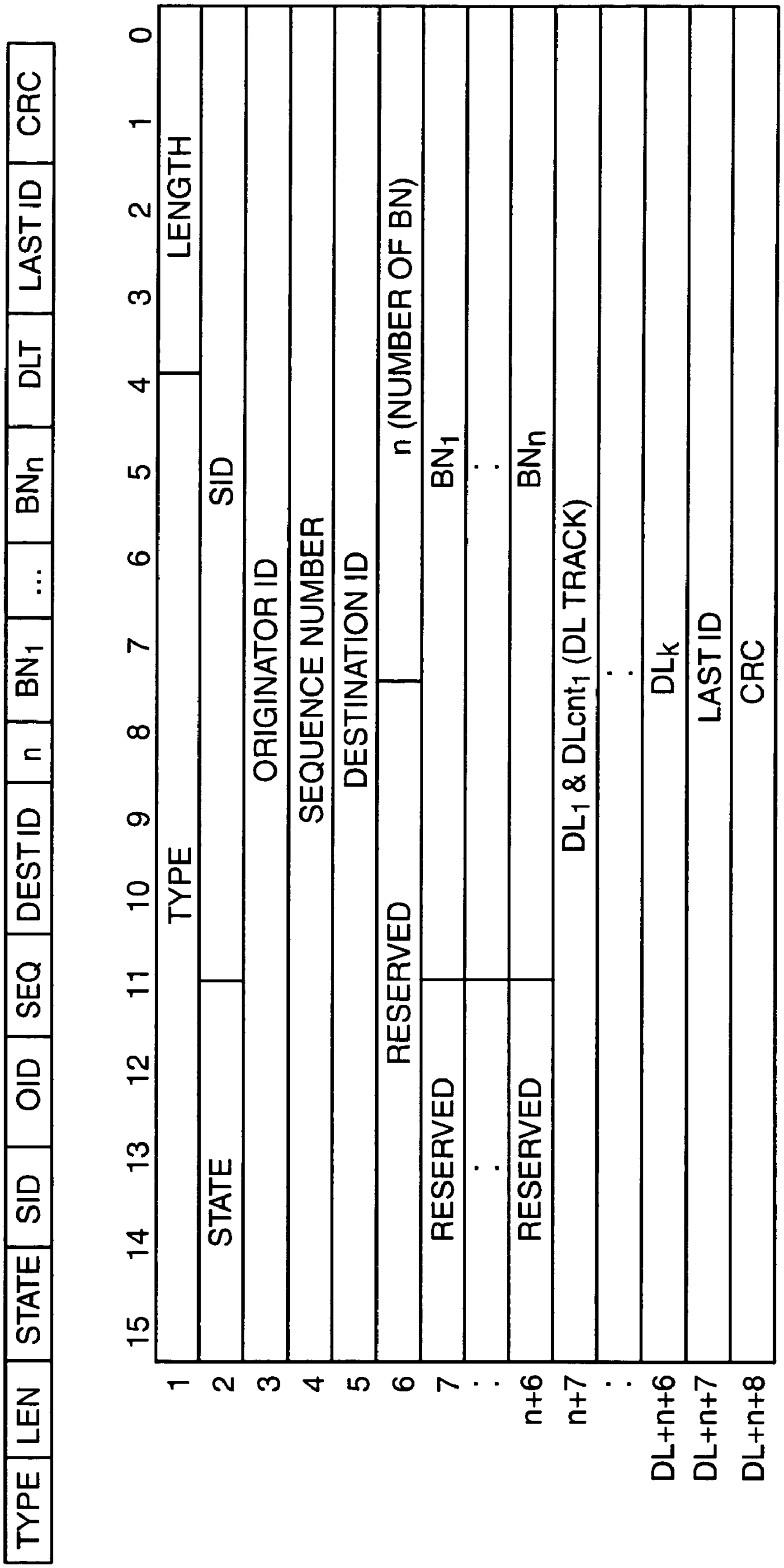
FIG. 19 shows one example of the format of a route discovery (RDisc) message according to the inventive protocol.

A RDisc Message format is shown in FIG. 19. In the figure:

Originator ID: Address of the node that originated the message. This field is not necessarily the same as the "Sender ID" which conveys the address of the node forwarding the message.

Sequence number: A unique identification number generated by the originator of each message. The sequence number is increased by 1 for each message generated by the originator node.

DestID: The destination address to which the message is to be routed

DL track: Record of domains to which the message has propagated.

Each new hop adds a new entry containing the ID of the domain lead in the domain Each hop adds to the DL counter (DLcnt)—the sum of all DLcnt results in the total number of hops traversed LastID: The ID of the previous hop intermediate node.

CRC—Cyclic redundancy check

Figures 20, 21:
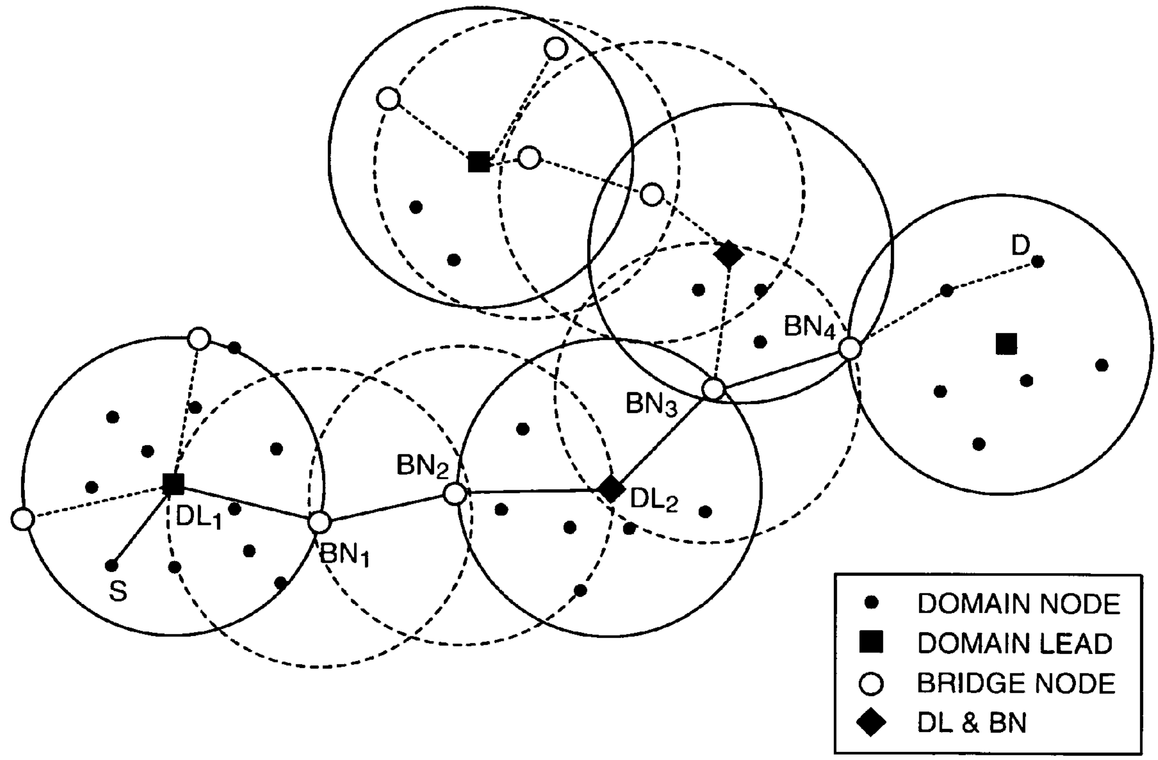
FIG. 20 shows a route discovery scenario.
FIG. 21 shows one example of the format of a route resolution (RRes) message according to the inventive protocol.

FIG. 20 illustrates a route discovery scenario. In FIG. 20:

(1) Source node S cannot locate desired destination node D in its routing tables, so node S sends a RDisc message to its local domain lead node (DL1), requesting a linking target node for a route to node D.

(2) Node DL1 searches for node D in its routing tables;

If node D is not found, node DL1 forwards the RDisc message request to all of node D's bridge nodes.

(3) The bridge nodes look for node D in their routing tables,

If node D is not found, the bridge nodes insert the IDs of their 1 hop DL nodes into the RDisc message for redundancy elimination, and forward the message to DL nodes within 1 or 2 hops.

(4) Repeat (2) & (3) until node D is found.

(5) When node D is found in a routing table of a node that receives the RDisc message, that node transmits a RRes message back to source node S, and forwards the RDisc message to destination node D.

In the scenario of FIG. 20, when the RDisc request reaches node BN4, node D is found in the H2 table of node BN4.

Route Resolution

A Route Resolution (RRes) message is generated once a route to the desired destination node is resolved. The RRes message responds to the RDisc message by including the ID of the desired destination node, and the ID of a local target node with which the source node can link in order to reach the destination node. The RRes message is unicast hop-by-hop back to the node that originated the corresponding RDisc message. As the RRes message propagates, each intermediate node (including bridge nodes and domain lead nodes) update their routing tables accordingly.

When the RRes message reaches the source node's domain, the corresponding DL node broadcasts the message to every domain node including the node that originated the RDisc message. All domain nodes update their routing tables by adding the destination node and the local target node into their Hk Tables. The target node must exist in the source node's H1 or H2 table.

By providing all domain nodes with the ID of a target node for reaching a particular destination node so that the domain nodes can update their Hk tables accordingly, future loading of the DL node is minimized. That is, the domain nodes no longer need to originate RDisc messages in order to acquire a link to the particular node. If more than one reply is received by a node that originates a RDisc message, all replies are stored in the Hop k table of that node.

A Route Resolution message format is shown in FIG. 21. In the figure:

The OID and Seq fields are the same as in the Route Discovery message

DestID: The address of the node that originated the RDisc message

LastID: The previous hop intermediate node ID

Figure 22:
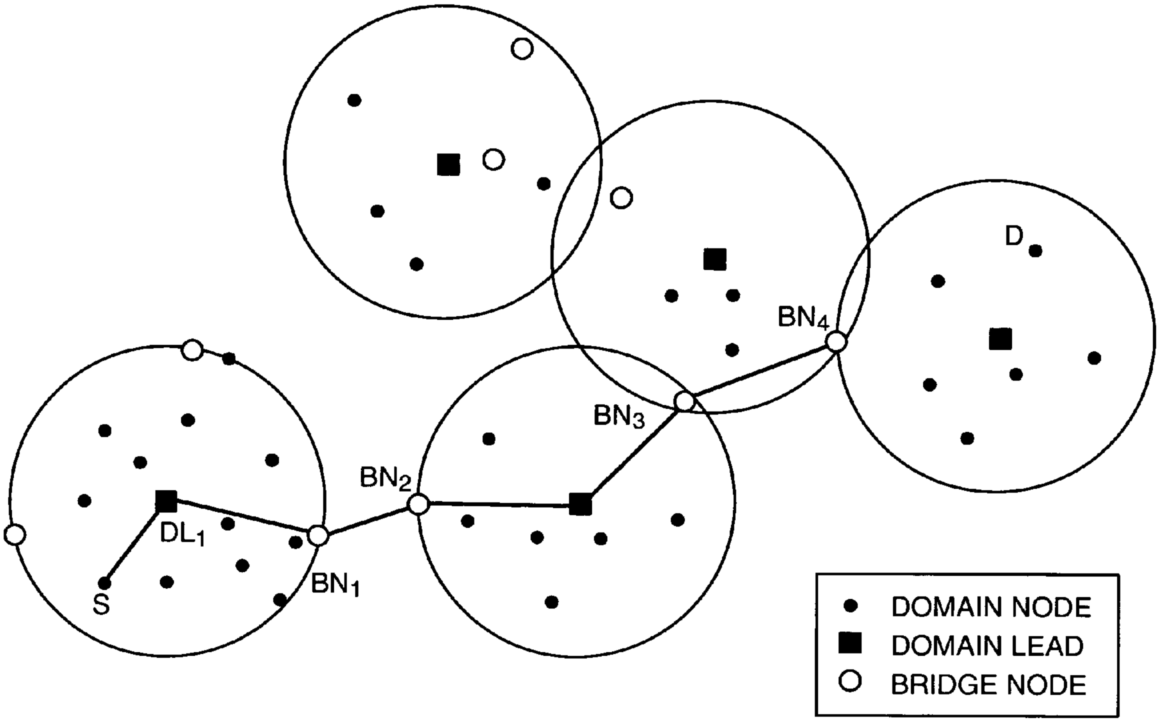
FIG. 22 illustrates a route resolution scenario.

HopCnt: The total number of hop counts toward the destination. This is incremented by 1 when the message goes through each intermediate node CRC—Cyclic redundancy check FIG. 22 illustrates a route resolution scenario. In FIG. 22:

(1) A bridge node ($BN_4$) discovers destination node (D) in its H2 Table $BN_4$ addresses a RRes message to a source node (S) and transmits the message to the previous hop node (LastID=$BN_3$).

(2) The RRes message is forwarded hop-by-hop to previous Bridge Nodes and to all Domain Lead nodes within one hop.

(3) Repeat (2) until node S is reached.

Dynamic Topology Routing

Each node in the network is responsible for distributing its local node topology information, and each node gains the most knowledge concerning any fast changing topology in its immediate vicinity. The AHDR protocol routes on a per hop basis, giving each node the ability to make a next hop decision depending on the link performance of the route. Multiple routes to a particular destination node (if available) may be stored in a node's routing tables, so a next hop routing decision can be determined at each hop. As a result, if a link state becomes congested, an intermediate node can reroute a packet stream through an alternative next hop neighbor without incurring control overhead to inform the source node of the route change.

Figure 23:
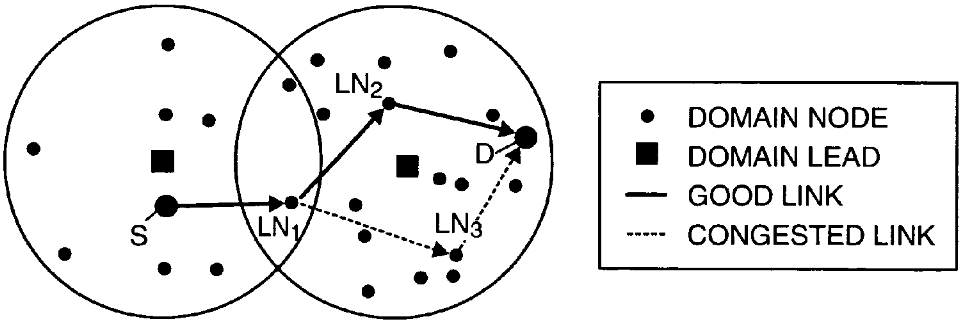
FIG. 23 illustrates a selection by an intermediate node of an alternate route to a destination node.

This concept is captured in FIG. 23, where an original path between node S and node D was routed via nodes LN1 and LN3. As link quality between node LN1 and node LN3 diminishes due to rapid congestion, fading, interference, or topology change, link node LN1 becomes aware of the condition and redirects data packets to node LN2 in real time. Source node S continues to send its message data packets to node LN1, and is not concerned with routing decisions made beyond the next hop. Therefore, the message stream to node D remains uninterrupted. Thus, AHDR enables QoS routing decisions to be made in real time so as to maintain reliable communication in networks with fast changing node topology.

Adaptive Power

Figure 24A:
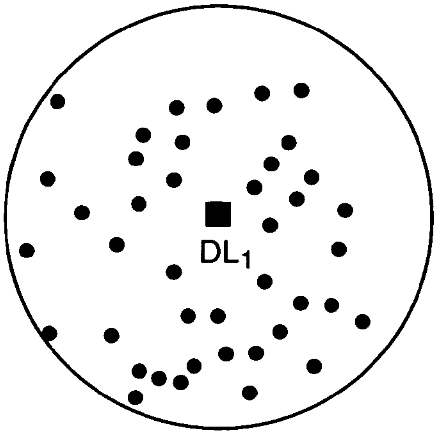
FIGS. 24(*a*) to 24(*c*) depict shrinking of the size of a given domain and the formation of new domains according to an adaptive power control feature of the inventive protocol.
Figure 24B:
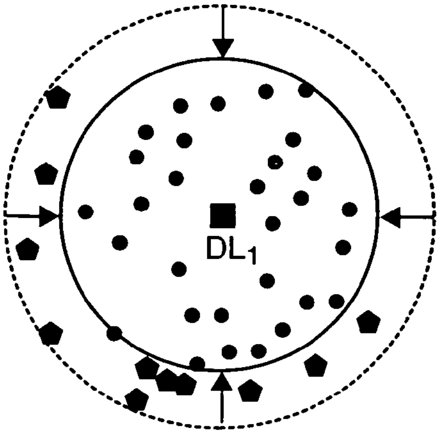
Figure 24C:
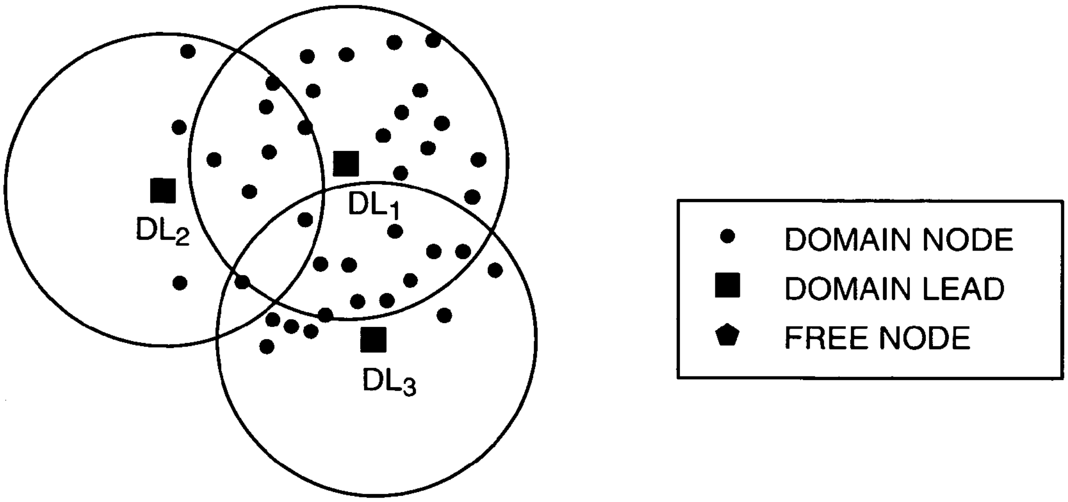

Adaptive power control enables the physical size of a domain to be limited by adjusting the transmission power of each of the domain nodes. Such control may therefore alleviate congestion by reducing each node's range of transmission and shrinking domain size. In FIGS. 24(*a*) to (*c*):

Domain lead node DL1 issues a power control (PC) message to reduce or strengthen the transmitting power of nodes in its domain.

Power reduction issued is dependent on the link congestion Indicator.

Some domain nodes will become free nodes due to down sizing of the current domain, but quickly form other domains with new domain lead nodes DL 2, DL 3 when using the reduced transmitting power.

Power control enables additional modes for the network, such as a receive only (RO) mode, and a low probability interception/low probability detection (LPI/LPD) mode.

At initialization, zombie nodes transmit TU0 messages at the controlled power.

A typical power control (PC) message format is shown below:

| Type | Len | SID | NPL | CRC |
|---|---|---|---|---|

Type: message type

Length: byte count of entire message

SID: Source node ID

NPL: New transmit power level

CRC: Cyclic redundancy check

Receive Only Networking Mode

Under AHDR, a receive only (RO) node may no longer transmit messages, including network control and management messages necessary for connectivity and mobility. A RO node is limited to receive functions only. Each node broadcasts a going silent (GS) message before entering the RO mode including the effective time, informing all nodes in hearing distance that the RO node may still receive, but can no longer transmit periodic updates or acknowledgments. The GS message also preferably contains update information from the node's routing tables, including all domain lead nodes within range.

A typical GS message format is shown below:

| Type | Len | SID | m | $DL_1$ | ... | $DL_m$ | CRC |
|---|---|---|---|---|---|---|---|

Type: Message type
Length: Byte count of entire message
SID: Source ID
m: Number of hop 1 Domain Leads
DL: Domain Lead ID
CRC: Cyclic redundancy check As mentioned, RO nodes receive all messages addressed to them, but do not transmit TU1, RRes, or any other updating messages. Otherwise, a RO node acts like a domain node, but it cannot function as a bridge node. When a RO node leaves the RO mode of operation, it re-enters the network as a zombie node, similar to the condition of a node at power on initialization. Once a RO node rejoins the network, it may broadcast TU0 and TU1 messages as before, and all 1 hop neighbor nodes having H2 entries for the RO node will change the status of the entries to H1.

IP Interoperablility

A MAC address coded in, e.g., 14 bits may be initially assigned to identify each mobile node on the network. An IP address may then be derived from the MAC address, and bound to the wireless interface as the host IP for all upper layer network protocols connecting with the network. A mobile node may be a multi-homed node belonging to both an ad hoc network, and to another intranet. Thus, the node may have another IP address for its Ethernet interface.

A tentative network address of 10.10.xx.xx is suggested for use, allowing a capacity of about 64,000 (64 K) nodes. An IP address may be derived, for example, by simply combining the network address with the MAC address.

Performance and Statistics

Intra-Domain Formation Time

Before the announcement of a DL node, each "free" node sends a TU1 message at a period of $T_f$. After the first $T_f$ interval, a free node establishes its own hop 1 (H1) table. The free node then incorporates this hop 1 information in its next TU 1 message during a second $T_f$ time interval. At the end of the second $T_f$ interval, each free node updates its hop 1 table and begins to build a hop 2 table. The free nodes are now able to compute their hop 1 coverage, and a DL node is announced within a third $T_f$ interval. During a fourth $T_f$ interval, each free node attains the status of a domain node and includes the ID of its DL node in its TU1 messages. Accordingly, a domain is formed after an interval of $4T_f$.

Inter-Domain Formation Time

Inter-domain formation occurs after formation of the individual domains (i.e., after 4Tf). Inter-Domain information eventually propagates throughout the entire network. Such information is exchanged among the domain lead nodes in the form of the topology update (TUd) messages that are transmitted every 2Tf. The propagation time depends on the topology of the domains in the network, for example, a tree structure, a star structure or a daisy-chained structure. Consider a worst case scenario, where the domains are daisy-chained. If MaxNumDomain is the maximum number of domains, then it takes MaxNumDomain hops to deliver the first domain info to the last domain.

Propagation time=(Transmission delay+Forwarding delay)*(MaxNumDomain−1)

NumDomain: The number of domains (=Total nodes/Domain size)

Transmission delay is the RF waveform transmitting time in the air.

Forwarding delay is the process time spent in each intermediate node (assume 40 ms including some congestion)

There are a total of 4096 possible nodes; and there could be 50, 100, 200 or 300 nodes in each domain.

Control Overhead

Control overhead (CO) includes the following elements:

TU1: The overhead for each Topology Update 1 message, which is sent by every domain node every 2Tf.

TUd: The overhead for each Topology Update among the Domains. Assume three forwardings within a domain are required.

RDisc: The overhead of the Route Discovery message for identifying a route to a known destination.

RRes: The overhead of reply messages to the Route Discovery message.

RDR: The total sum of Route Discovery messages (RDisc) and Reply messages of RDisc (RRes)

½ RDRs are from RDisc, ½ RDRs are from RRes

Thus, CO=TU1+TUd+RDR

Figure 25:
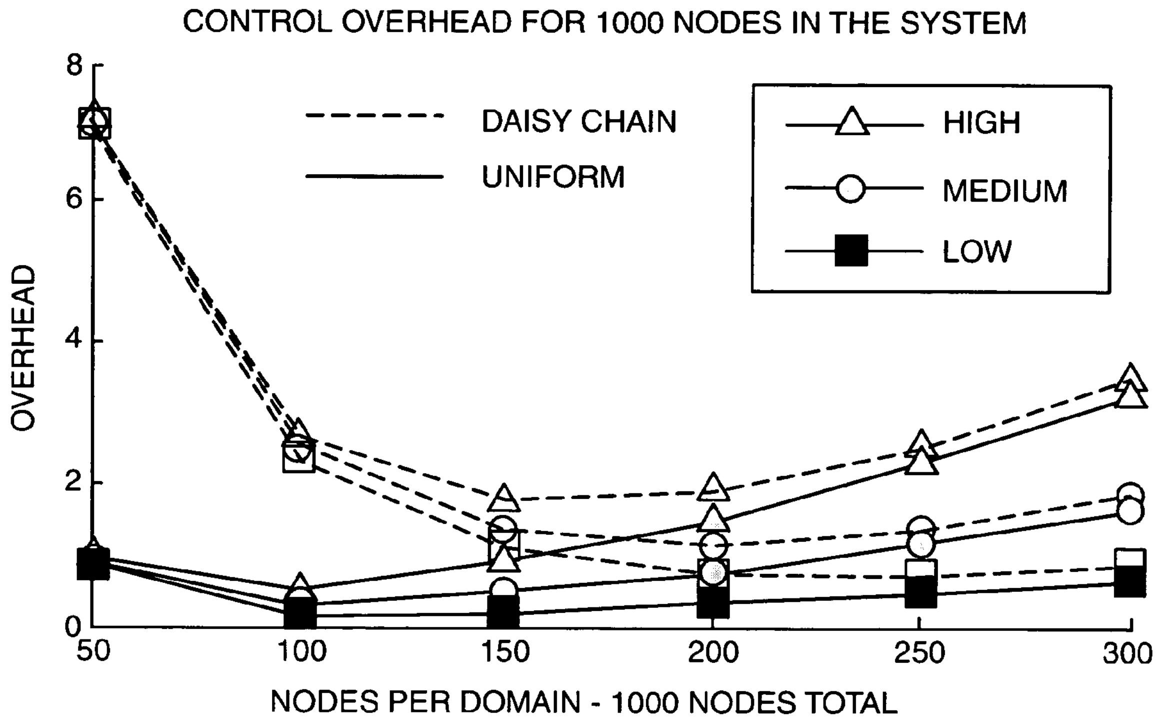
FIG. 25 is a plot showing network control overhead with respect to domain size.

Performance Analysis (FIG. 25)

FIG. 25 is a plot of control overhead in a 1000 node network, as a function of nodes per domain. The dashed lines on the plot represent a daisy chain domain configuration, and the solid lines represent a uniformly distributed network topology, where domains are also in a uniformly distributed configuration.

While a network with fewer domains and a larger number of nodes per domain will have a shorter formation time, the network control overhead grows as the number of nodes in each domain increases. AHDR adapts to balance the tradeoffs and manage the optimal domain size.

As described herein, AHDR implements a strategic combination of proactive and reactive routing schemes. For network entry and neighbor discovery, nodes exchange one hop neighbor information as compiled in their routing tables in the form topology update (TU0 and TU1) messages. The proactive exchange of these messages enables each domain node to have current knowledge of one and two hop routes to other nodes. Routes between a given source node and a given destination node may be optimized based on overall Link State Levels between the two nodes. The levels may be determined according to parameters such as, for example, congestion, PER/BER, SNR, and the like.

Routing beyond two hops is facilitated by the proactive exchange of the TUd messages among domain lead nodes throughout the network. This exchange provides each of the domain lead nodes with knowledge of multiple routes leading to nodes in other domains.

Message routing is a determined on a per hop basis. Each node can make a next hop decision depending on the performance of the potential link. The decision may be based a QoS request for the message data packets to be forwarded, stability of the route, class of service of the source node, and/or a composite link state level along the entire route. Such routing logic provides an enhanced level of reliability for networks operating with fast changing node topologies. Thus, an intermediate node can reroute an ongoing packet stream through a different next hop neighbor if a current link becomes congested or weak due to mobility patterns or high traffic load, without informing the source node of the route change. Accordingly, AHDR does not rely on network convergence to provide reliable routing.

While the foregoing represents preferred embodiments of the invention, it will be understood by those skilled in the art that various modifications and changes may be made without departing from the spirit and scope of the invention, and that the invention includes all such modifications and changes as come within the scope of the following appended claims.

We claim:

1. A method of exchanging information among nodes in a mobile ad hoc network (MANET), comprising:

providing a controller or a processor at each node for performing operations to be carried out by or at the node;

forming a number of logical domains in the network by periodically exchanging first topology update (TU1) messages within one or more groups of neighboring nodes, each TU1 message identifying (i) a node sending the TU1 message, and (ii) certain other nodes within a range of one hop from the node sending the TU1 message as a measure of node coverage of the sending node;

determining, within each group of neighboring nodes, a node having an optimum node coverage among the nodes of each group, and designating the determined node as a domain lead (DL) node of the group;

defining a domain as containing all nodes within a one hop range of the

DL node;

associating with each node of a given domain including the DL node, a set of one or more bridge nodes (BN) for linking each node with other nodes in neighboring domains by defining, at each node of the given domain, a first routing table for identifying other nodes that are in a range of one hop (H1 nodes), periodically updating the H1 nodes identified in the first routing table according to the TU1 messages received at each node, and selecting, at each node, members of the set of bridge nodes from among H1 nodes currently identified in the first routing table at each node, so that each member of which the set of bridge nodes has an optimal node coverage of a different neighboring domain, thereby enabling each node of the given domain to link with other nodes in the neighboring domains through its associated set of bridge nodes, the selection of which adapts to changes in network topology; and periodically originating domain topology update (TUd) messages from each of a number of DL nodes in the network, and forwarding the TUd messages through the set of bridge nodes associated with each DL node originating a TUd message, including identifying in each TUd message those nodes contained in the domain of the originating DL node, thereby disseminating network node topology information via an architecture defined by the DL nodes and the sets of bridge nodes associated with each of the DL nodes in the network.

2. The method of claim 1, including discovering the presence of neighboring network nodes by an outside node desiring to enter the network, by transmitting topology update zero (TU0) messages from the outside node for identifying the outside node.

3. The method of claim 2, including exchanging the TU0 messages among a number of nodes desiring to enter the network, and identifying those nodes from which a TU0 message was received in the first routing table at each of the entering nodes.

4. The method of claim 1, wherein the TUd message forwarding step includes forwarding a given TUd message from the set of bridge nodes associated with the DL node originating the TUd message, to other DL nodes within a one hop or a two hop range of each bridge node.

5. The method of claim 4, including identifying in each TUd message an identification (ID) of the DL node originating the message, and the IDs of the set of bridge nodes selected by the originating DL node.

6. A method according to claim 1, wherein the domain lead node designating step is repeated at determined intervals for adapting to changes in network topology, including, at a given node of a defined domain;

designating the given node as a new DL node of the domain if the coverage of the given node surpasses the coverage of a currently designated DL node by a defined threshold;

broadcasting a domain lead announcement (DLA) message from the given node for announcing the given node as a new DL node; and broadcasting a domain lead renouncement (DLR) message from the currently designated DL node to renounce its designation as a DL node, and including in the DLR message an acknowledgment of the new DL node.

7. A method of exchanging information among nodes in a mobile ad hoc network (MANET), comprising:

providing a controller or a processor at each node for performing operations to be carried out by or at the node;

forming a number of logical domains in the network by periodically exchanging first topology update (TU1) messages within one or more groups of neighboring nodes, each TU1 message identifying (i) a node sending the TU1 message, and (ii) certain other nodes within a range of one hop from the node sending the TU1 message as a measure of node coverage of the sending node;

determining, within each group of neighboring nodes, a node having an optimum node coverage among the nodes of each group, and designating the determined node as a domain lead (DL) node of the group;

defining a domain as containing all nodes within a one hop range of the DL node;

associating with each node of a given domain including the DL node, a set of one or more bridge nodes (BN) for linking each node with other nodes in neighboring domains by selecting as members of the set of bridge nodes certain nodes of the given domain each of which has an optimal node coverage of a different neighboring domain, thereby enabling each node of the given domain to link with other nodes in the neighboring domains through its associated set of bridge nodes;

periodically originating domain topology update (TUd) messages from each of a number of DL nodes in the network, and forwarding the TUd messages through the set of bridge nodes associated with each DL node originating a TUd message, including identifying in each TUd message those nodes contained in the domain of the originating DL node, thereby disseminating network node topology information via an architecture defined by the DL nodes and the sets of bridge nodes in the network;

defining, at a given node of a defined domain, a first routing table for identifying nodes that are in a range of one hop (H1 nodes) from the given node; and defining, at said given node, a second routing table for identifying nodes that are in a range of two hops (H2 nodes) from the given node, together with one or more H1 nodes with which the given node can link to acquire a route to each of the H2 nodes.

8. The method of claim 7, including receiving the TUd messages at a given domain lead (DL) node, and defining at the given DL node a third routing table for identifying nodes that are beyond a range of two hops (Hk nodes) from the DL node.

9. The method of claim 8, including entering for each node identified in the third routing table at the given DL node, (i) a destination node ID, (ii) a node in one hop range with which the DL node can link to acquire a path to the destination node, and (iii) a link performance (LP) metric for each of one or more routing paths to the destination node.

10. A method according to claim 7, including;

obtaining, at a given source node in the network, routing path information for a destination node not entered in a routing table at the source node; and if more than one routing path is available for traffic between the source node and the destination node, acquiring a link performance metric for each path to the destination node, including;

counting a number of hops along the path;

determining a number of links along the path having a certain quality level; and determining a number of links along the path having a certain congestion level.

11. The method of claim 7, including discovering a route for a message from a given source node in a first domain of the network and destined to a certain destination node in a second domain of the network, by;

transmitting a route discovery (RDisc) message from the source node to a DL node of the first domain, the RDisc message identifying the destination node; and receiving, at the source node, a responsive route resolution (RRes) message from the DL node of the first domain, the RRes message identifying a link node in the first domain with which the source node can link to route the message to the destination node in the second domain.

12. The method of claim 11, wherein the discovering step includes determining, at the DL node of the first domain, if the destination node is entered in a routing table at the DL node of the first domain.

13. The method of claim 12, including, if the result of the determining step is affirmative, transmitting a responsive route resolution (RRes) message from the DL node of the first domain to the source node, the RRes message identifying a link node in the first domain through which the source node can reach the destination node.

14. The method of claim 12, including, if the result of the determining step is negative, forwarding the RDisc message from the DL node of the first domain to the set of bridge nodes associated with the DL node.

15. The method of claim 14, including determining if the destination node is entered in a routing table of one of the bridge nodes associated with the DL node of the first domain, and, if the result is affirmative, sending the RRes message from the one bridge node to the DL node for forwarding to the source node.

16. The method of claim 14, including, if the destination node is not entered in a routing table of one of the bridge nodes associated with the DL node of the first domain, forwarding the RDisc message from each of the associated bridge nodes to DL nodes within a range of two hops from the bridge nodes other than the DL node or nodes that forwarded the RDisc message.

17. The method of claim 16, including continuing to forward the RDisc message successively to DL nodes, and to sets of bridge nodes associated with the DL nodes to which the RDisc message is forwarded, until a defined maximum propagation count is reached or until all DL nodes in the network receive the message.

18. The method of claim 17, including determining redundant paths and eliminating loops in propagation of the RDisc message through the network, by appending to each RDisc message the identifications of one or more DL nodes in one hop range of each node that forwards the message, thereby defining covered domains and avoiding loops in the propagation path of the RDisc message.

19. A method of exchanging information among nodes in a mobile ad hoc network (MANET), comprising:

providing a controller or a processor at each node for performing operations to be carried out by or at the node;

forming a number of logical domains in the network by periodically exchanging first topology update (TU1) messages within one or more groups of neighboring nodes, each TU1 message identifying (i) a node sending the TU1 message, and (ii) certain other nodes within a range of one hop from the node sending the TU1 message as a measure of node coverage of the sending node;

determining, within each group of neighboring nodes, a node having an optimum node coverage among the nodes of each group, and designating the determined node as a domain lead (DL) node of the group;

defining a domain as containing all nodes within a one hop range of the DL node;

associating with each node of a given domain including the DL node, a set of one or more bridge nodes (BN) for linking each node with other nodes in neighboring domains by selecting as members of the set of bridge nodes certain nodes of the given domain each of which has an optimal node coverage of a different neighboring domain, thereby enabling each node of the given domain to link with other nodes in the neighboring domains through its associated set of bridge nodes, and periodically originating domain topology update (TUd) messages from each of a number of DL nodes in the network, and forwarding the TUd messages through the set of bridge nodes associated with each DL node originating a TUd message, including identifying in each TUd message those nodes contained in the domain of the originating DL node, thereby disseminating network node topology information via an architecture defined by the DL nodes and the sets of bridge nodes in the network;

wherein the TUd message forwarding step includes forwarding a given TUd message from a first bridge node associated with the DL node originating the TUd message to a second bridge node associated with the first bridge node, after appending to the TUd message an identification of one or more DL nodes in one hop range of the first bridge node, thereby defining covered domains and preventing redundant paths and loops in the message forwarding path;

forwarding the TUd message from the second bridge node to a DL node within a one hop or a two hop range of the second bridge node, other than DL nodes in the covered domains; and continuing to forward the TUd message via successively associated bridge nodes until either a certain maximum propagation count is reached, or all DL nodes in the network are identified as covered in the message.

20. A method of exchanging information among nodes in a mobile ad hoc network (MANET), comprising:

providing a controller or a processor at each node for performing operations to be carried out by or at the node;

forming a number of logical domains in the network by periodically exchanging first topology update (TU1) messages within one or more groups of neighboring nodes, each TU1 message identifying (i) a node sending the TU1 message, and (ii) certain other nodes within a range of one hop from the node sending the TU1 message as a measure of node coverage of the sending node;

determining, within each group of neighboring nodes, a node having an optimum node coverage among the nodes of each group, and designating the determined node as a domain lead (DL) node of the group;

defining a domain as containing all nodes within a one hop range of the

DL node;

associating with each node of a given domain including the DL node, a set of one or more bridge nodes (BN) for linking each node with other nodes in neighboring domains by selecting as members of the set of bridge nodes certain nodes of the given domain each of which has an optimal node coverage of a different neighboring domain, thereby enabling each node of the given domain to link with other nodes in the neighboring domains through its associated set of bridge nodes;

periodically originating domain topology update (TUd) messages from each of a number of DL nodes in the network, and forwarding the TUd messages through the set of bridge nodes associated with each DL node originating a TUd message, including identifying in each TUd message those nodes contained in the domain of the originating DL node, thereby disseminating network node topology information via an architecture defined by the DL nodes and the sets of bridge nodes in the network;

determining, at a given node of the network, a link state level (LSL) representing a transmission condition of each link from the given node to certain nodes in one hop range of the given node;

deriving, at the given node, a link performance (LP) metric for each of one or more routing paths from the given node to a desired destination node in two or more hop range of the given node, including identifying a target node ion in one hop range for each path, and deriving the LP metric for each path according to the LSL for each link along the path from the given node to the destination node;

selecting, at the given node, a certain path according to the derived LP for the path; and originating a message to the destination node from the given node by sending the message from the given node to the target node identified for the selected path.

21. The method of claim 20, including deriving the LP metric for each routing path according to a number of hops over the path from the given node to the desired destination node.

22. The method of claim 20, including deriving the LP metric for each routing path according to a number of a number of links along the path having a certain quality level.

23. The method of claim 20, including deriving the LP metric for each routing path according to a number of links along the path having a certain congestion level.

24. The method of claim 20, including maintaining a first routing table at the given node, and entering in the first routing table identifications of the nodes in one hop range (H1 nodes) of the given node together with a link state level for the link to each H1 node.

25. The method of claim 24, including maintaining a second routing table at the given node, and entering in the second routing table (i) the nodes in two hop range (H2 nodes) of the given node, together with one or more H1 nodes with which the given node can link to acquire a path to each H2 node, and (ii) a link state level for each link of a selected path from the given node to a given H2 node.

* * * * *